US009594236B2

(12) United States Patent
Akiyama

(10) Patent No.: US 9,594,236 B2
(45) Date of Patent: Mar. 14, 2017

(54) PROJECTION OPTICAL SYSTEM AND IMAGE PROJECTION APPARATUS INCLUDING THE SAME

(71) Applicant: CANON KABUSHIKI KAISHA, Tokyo (JP)

(72) Inventor: Yusuke Akiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 14/811,682

(22) Filed: Jul. 28, 2015

(65) Prior Publication Data

US 2016/0041373 A1 Feb. 11, 2016

(30) Foreign Application Priority Data

Aug. 5, 2014 (JP) ................ 2014-159211

(51) Int. Cl.
| | | |
|---|---|---|
| G02B 15/14 | (2006.01) |
| G02F 1/00 | (2006.01) |
| G02B 15/177 | (2006.01) |
| G02B 13/04 | (2006.01) |
| G02B 13/16 | (2006.01) |
| G02B 27/00 | (2006.01) |

(52) U.S. Cl.
CPC ........... G02B 15/177 (2013.01); G02B 13/04 (2013.01); G02B 13/16 (2013.01); G02B 27/0025 (2013.01)

(58) Field of Classification Search
CPC ...... G02B 17/00; G02B 13/04; G02B 13/143; G02B 21/36; G02B 27/0043; G02B 27/02; G02B 27/18; G02B 27/2292; G02B 27/4222; C03C 3/04
USPC ....... 359/649, 650, 680; 428/1.32, 415, 417; 501/2, 11, 900
See application file for complete search history.

(56) References Cited

U.S. PATENT DOCUMENTS

| | | | | |
|---|---|---|---|---|
| 8,570,662 | B2 * | 10/2013 | Eguchi ................. | G02B 15/17 348/340 |
| 9,116,331 | B2 * | 8/2015 | Masui ................. | G02B 13/16 |
| 9,389,399 | B2 * | 7/2016 | Koizumi ............... | G02B 13/06 |
| 2005/0200967 | A1 | 9/2005 | Yamasaki et al. | |
| 2009/0195884 | A1 | 8/2009 | Inoko | |
| 2011/0109976 | A1 | 5/2011 | Amano | |

* cited by examiner

*Primary Examiner* — Stephone B Allen
*Assistant Examiner* — Travis Fissel
(74) *Attorney, Agent, or Firm* — Canon USA, Inc.

(57) ABSTRACT

A projection optical system including a plurality of positive lenses and a plurality of negative lenses is provided. Values for an Abbe number and anomalous dispersion of materials for a positive lens and a negative lens arranged in a predetermined range from an enlargement conjugate side and values for the Abbe number and the anomalous dispersion of materials for a positive lens and a negative lens arranged in a predetermined range from a reduction conjugate side are appropriately set.

8 Claims, 27 Drawing Sheets

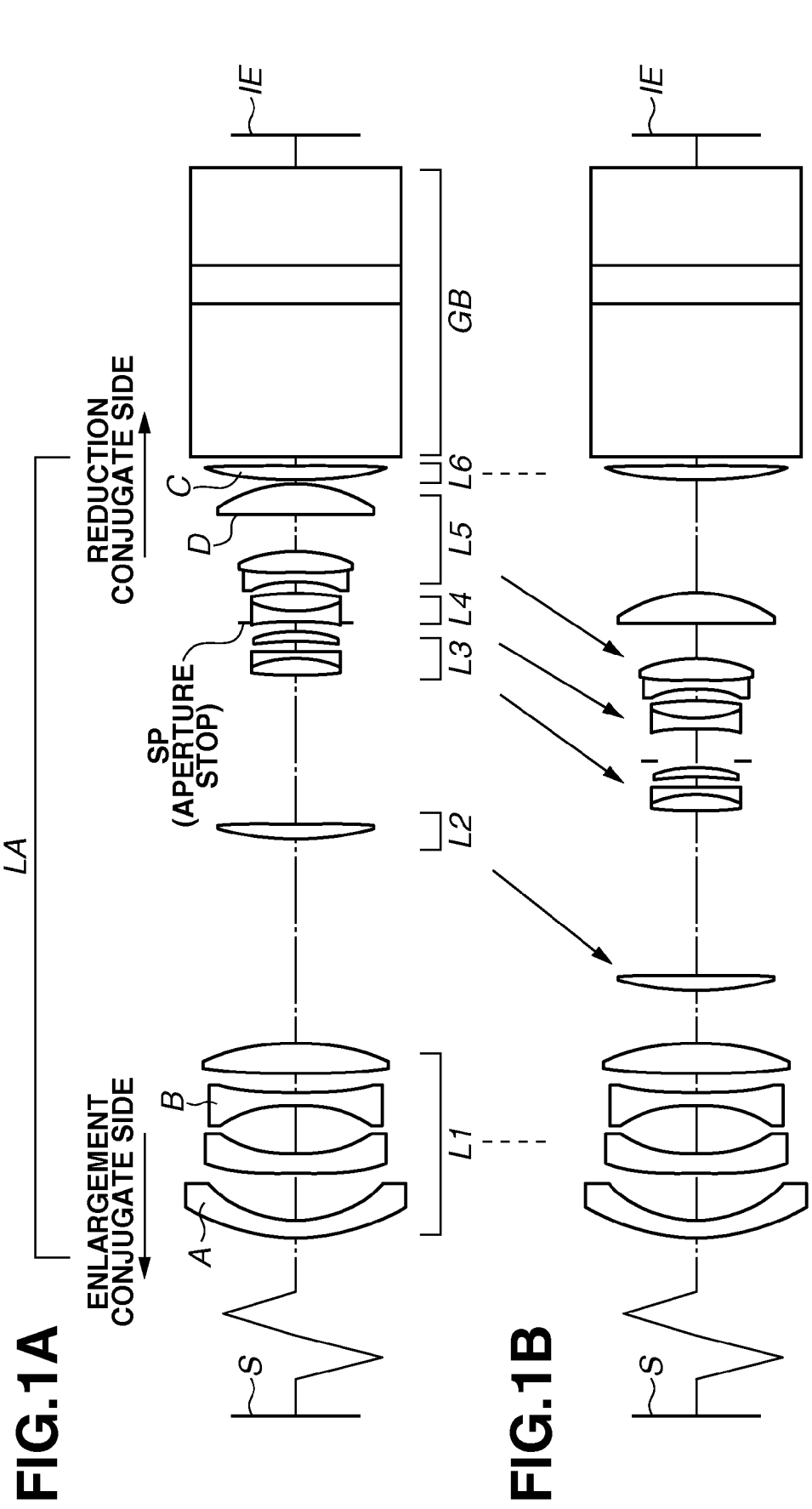

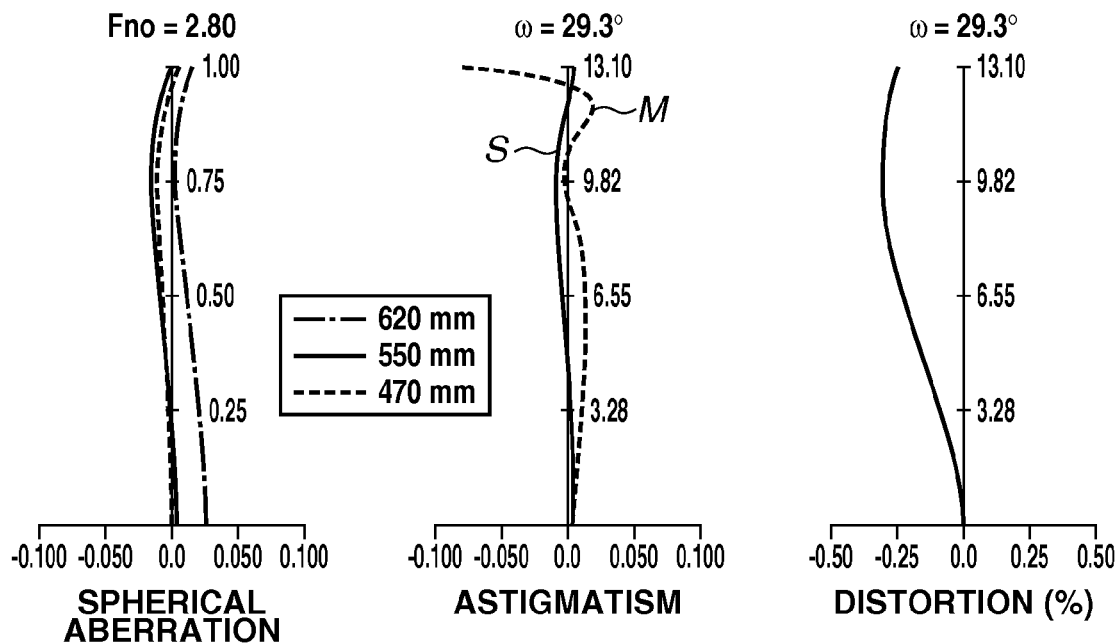
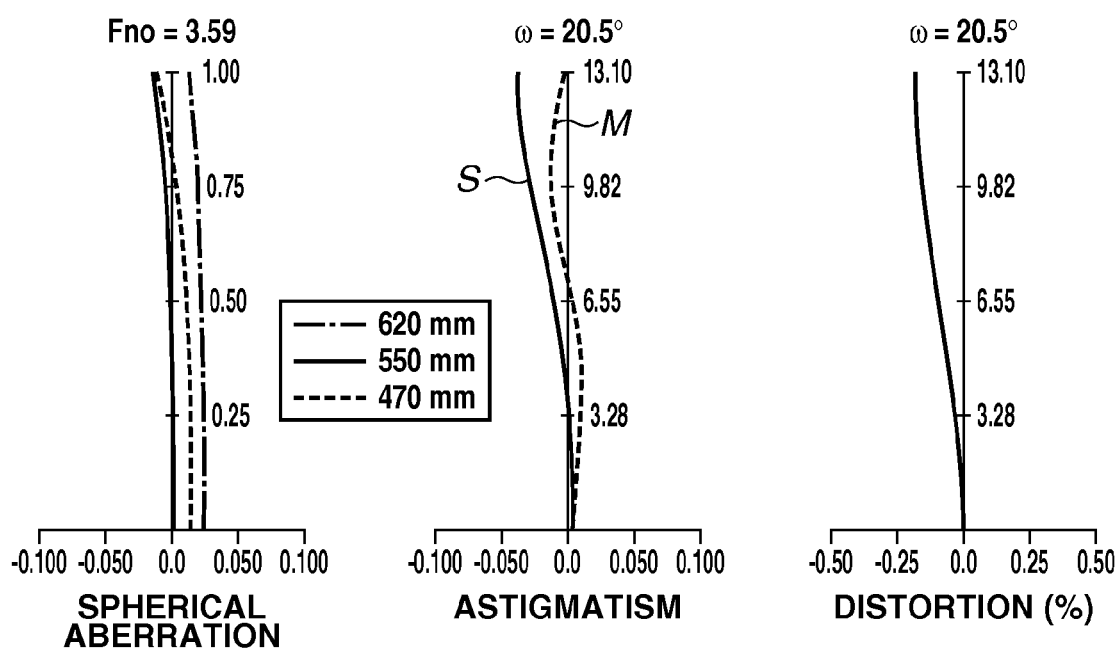

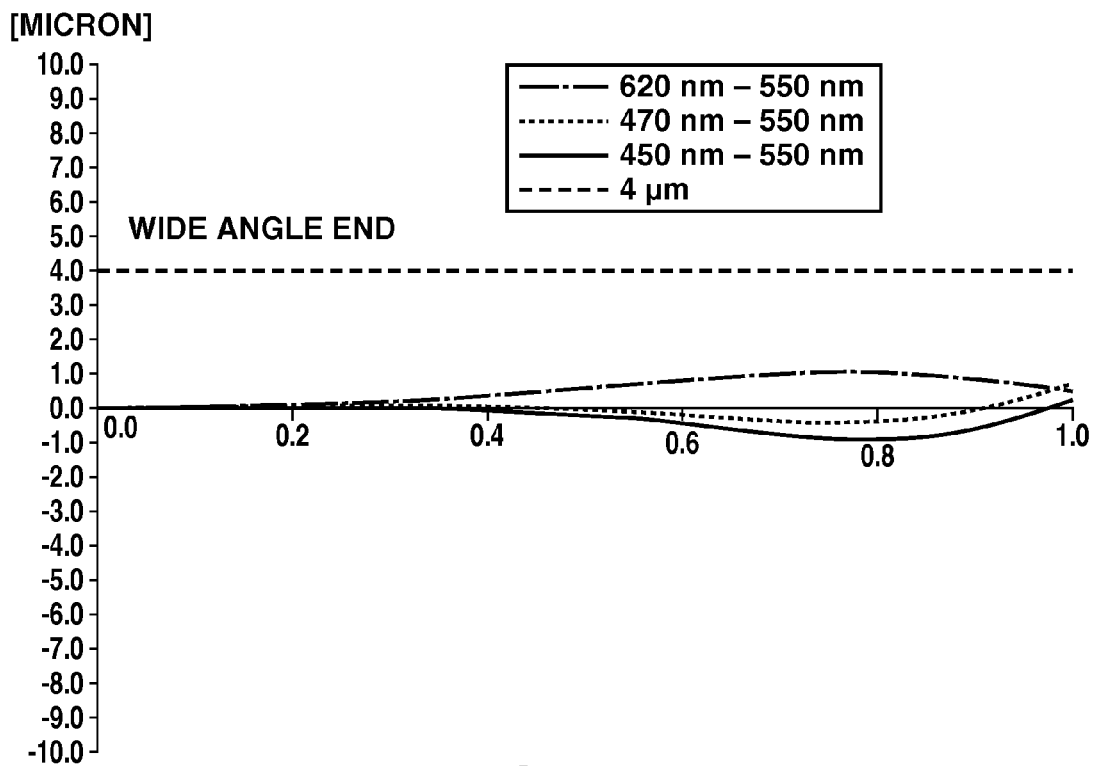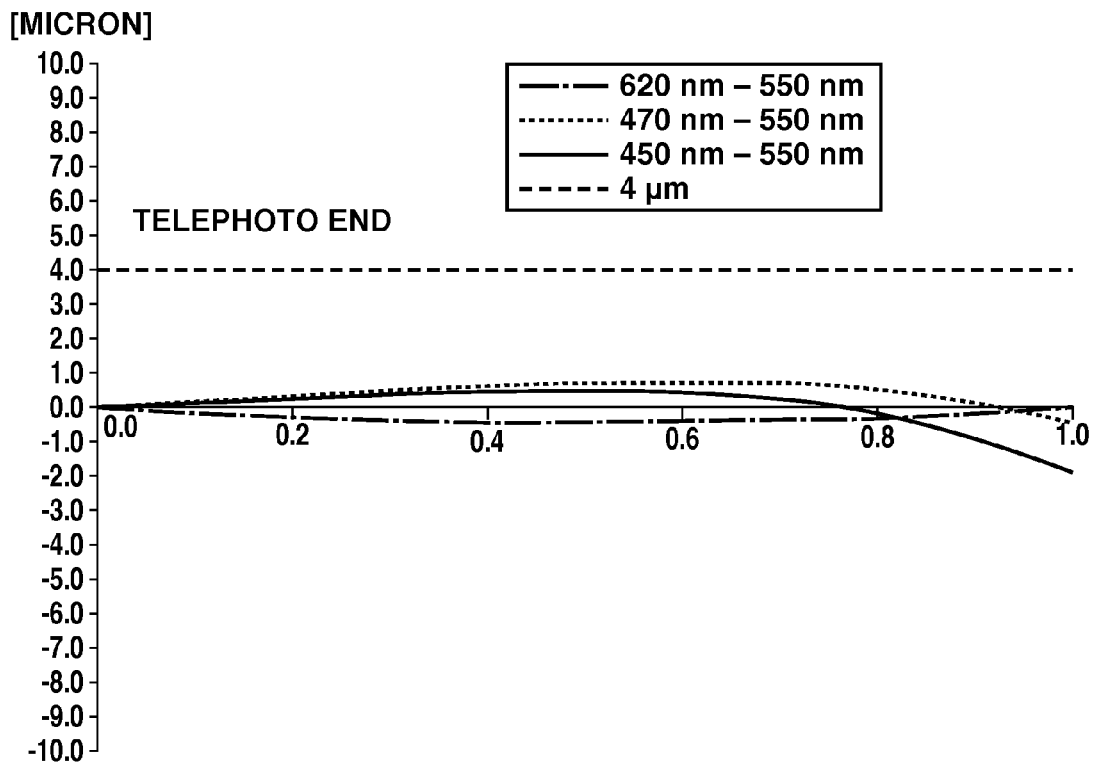

WIDE ANGLE END

TELEPHOTO END

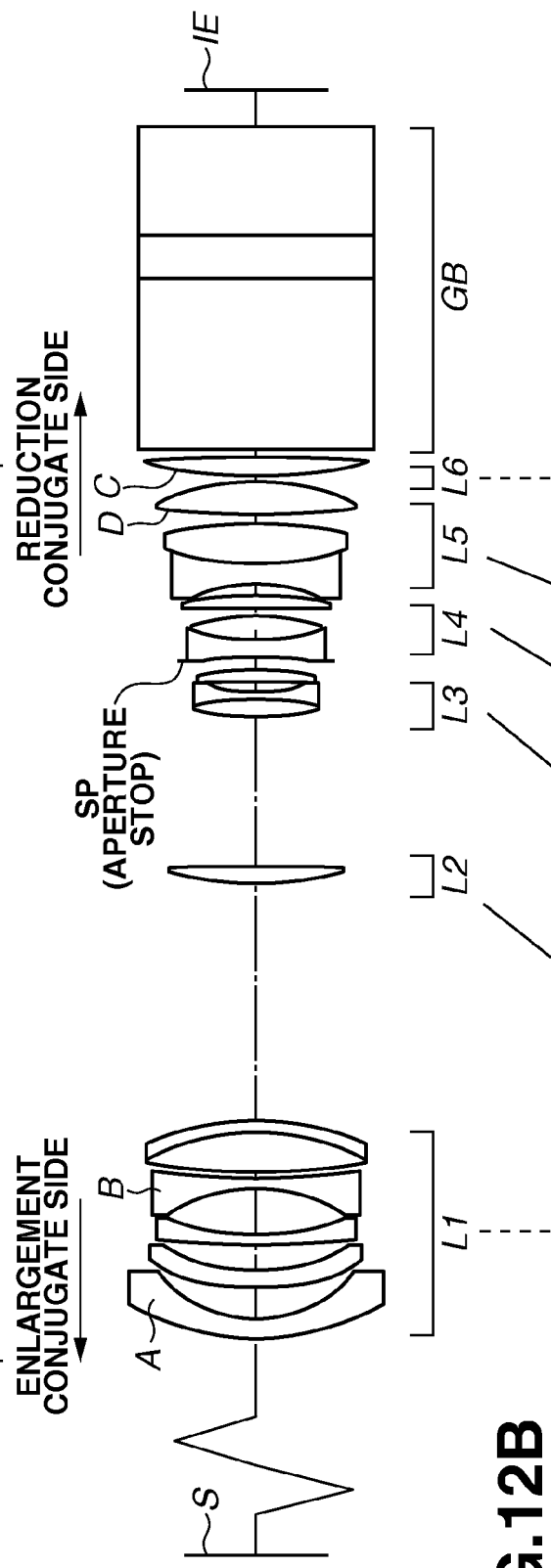
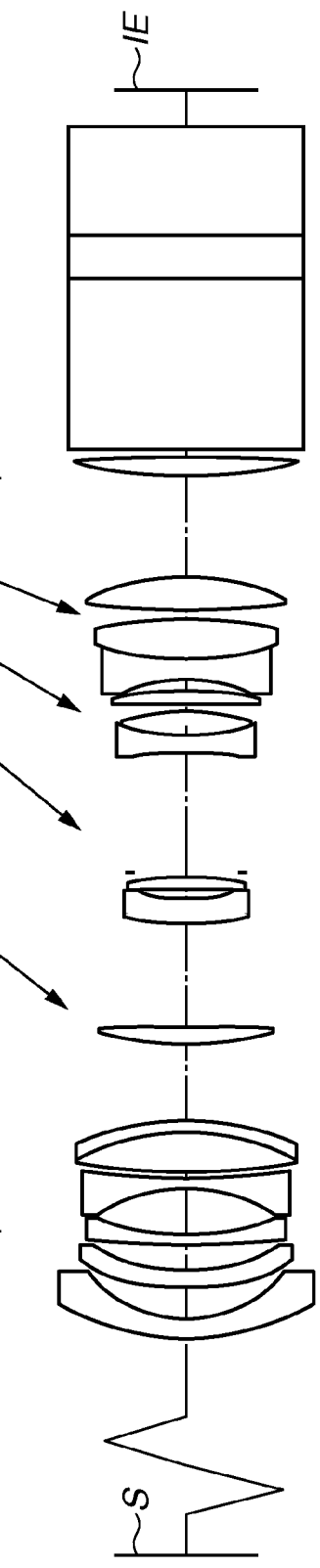
FIG.12A
FIG.12B

WIDE ANGLE END

TELEPHOTO END

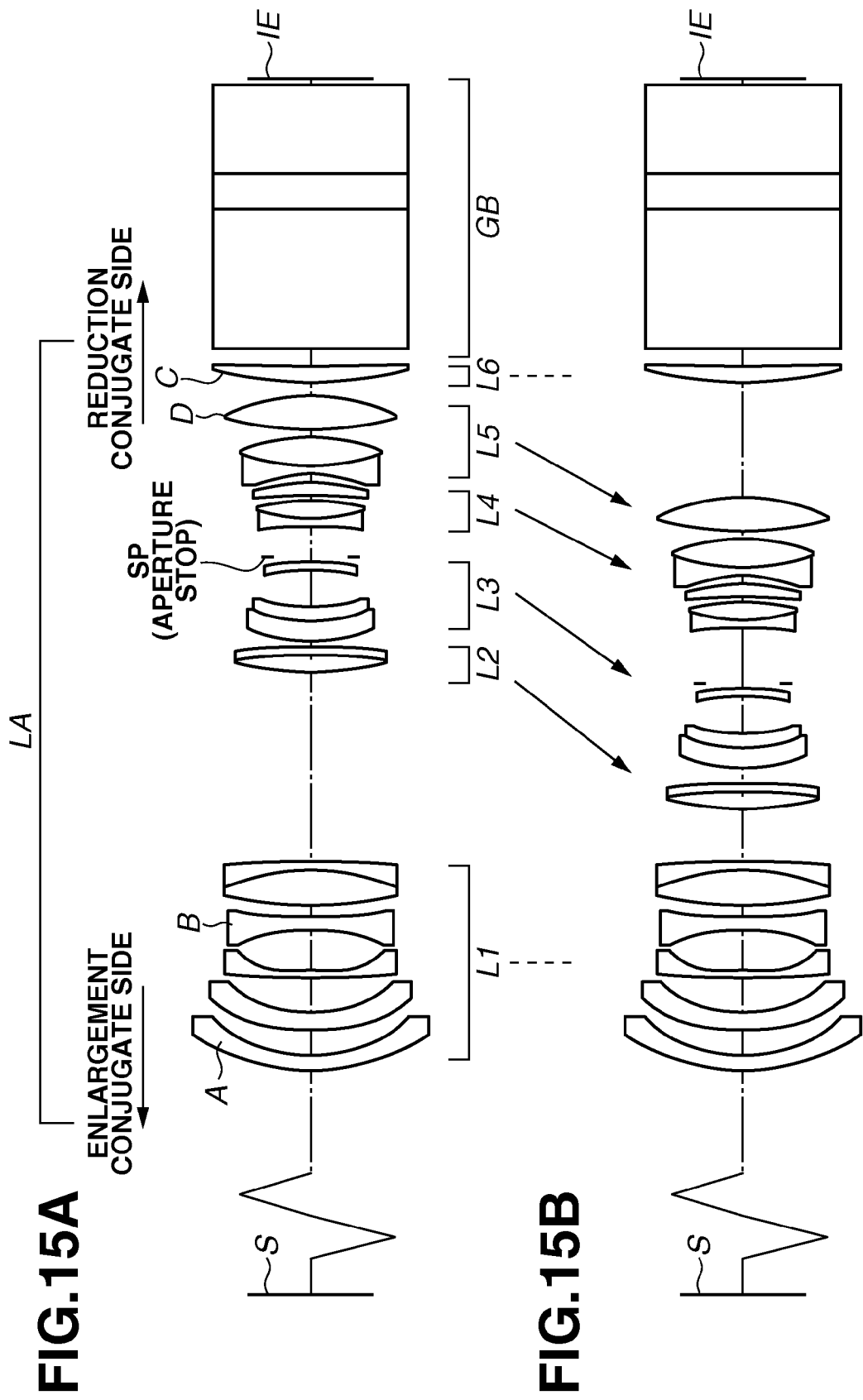

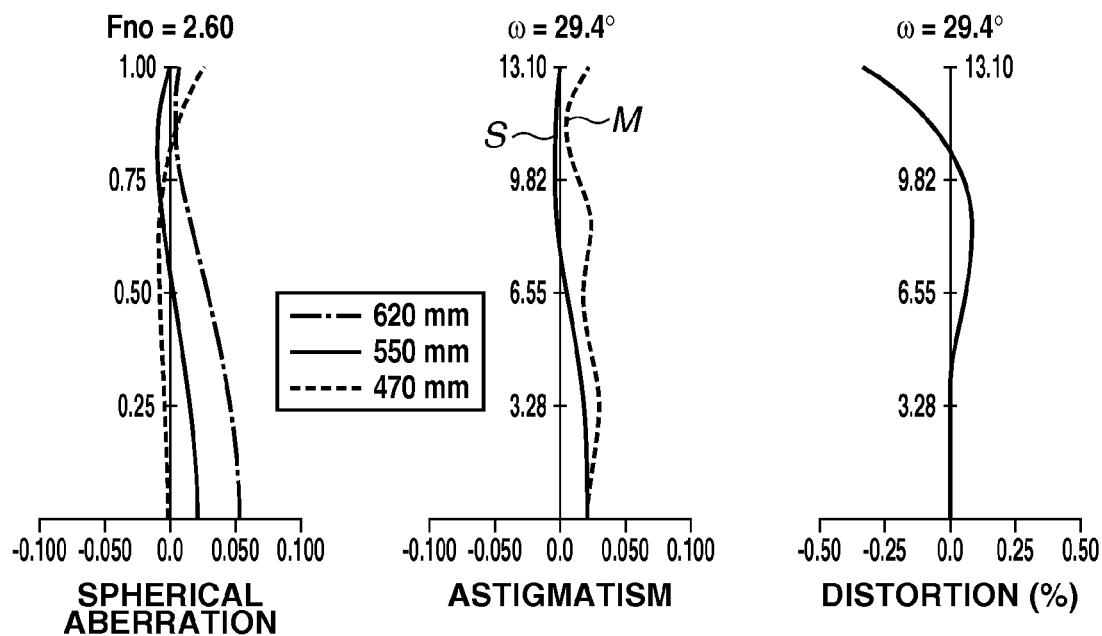
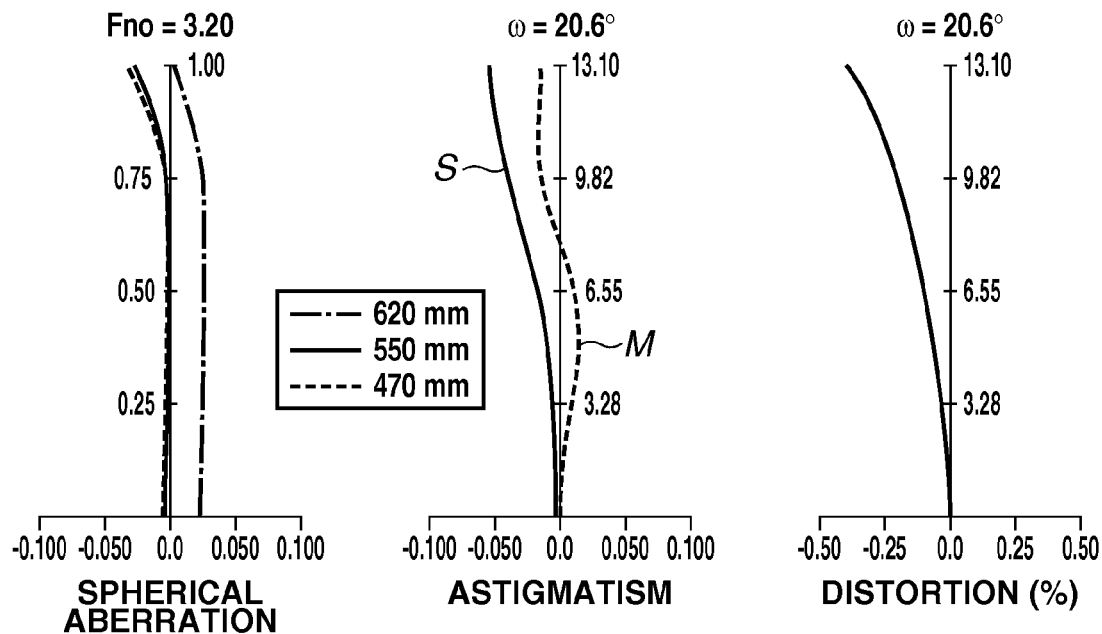

FIG.22

Numerical Example 1 f = 23.3 to 35.0 (Zoom ratio 1.5) ω = 20.5 to 29.3° F/2.80 to 3.59

|  | r | d | nd | νd | Effective diameter | θgf | Δθgf | Prism direction |
|---|---|---|---|---|---|---|---|---|
| OBJ | ∞ | 2240.00 |  |  |  |  |  |  |
| 1 | 45.000 | 3.18 | 1.808 | 22.7 | 42.26 | 0.631 | 0.025 | Upward |
| 2 | 25.003 | 9.49 |  |  | 36.11 |  |  |  |
| *3 | 342.121 | 4.00 | 1.531 | 55.9 | 34.43 | 0.550 | 0.000 | Upward |
| *4 | 36.734 | 9.69 |  |  | 31.09 |  |  |  |
| 5 | -31.923 | 2.69 | 1.497 | 81.5 | 30.81 | 0.537 | 0.031 | Upward |
| 6 | 98.033 | 3.91 |  |  | 32.73 |  |  |  |
| 7 | 170.092 | 6.01 | 1.834 | 37.1 | 34.62 | 0.578 | -0.004 | Downward |
| 8 | -51.967 | Variable |  |  | 35.03 |  |  |  |
| 9 | 62.474 | 3.05 | 1.801 | 34.9 | 29.29 | 0.586 | 0.001 | Downward |
| 10 | -338.615 | Variable |  |  | 29.04 |  |  |  |
| 11 | 90.770 | 3.31 | 1.678 | 55.3 | 16.66 | 0.547 | -0.005 | Downward |
| 12 | -23.672 | 1.50 | 1.834 | 37.1 | 16.26 | 0.578 | -0.004 | Upward |
| 13 | 277.441 | 1.82 |  |  | 15.94 |  |  |  |
| 14 | -68.901 | 2.00 | 1.697 | 55.5 | 15.76 | 0.543 | -0.008 | Downward |
| 15 | -33.082 | 1.00 |  |  | 15.78 |  |  |  |
| 16Stop SP | ∞ | Variable |  |  | 15.12 |  |  |  |
| 17 | -96.589 | 2.29 | 1.801 | 34.9 | 15.29 | 0.586 | 0.001 | Downward |
| 18 | 26.012 | 3.37 | 1.487 | 70.2 | 15.85 | 0.530 | 0.004 | Downward |
| 19 | -52.438 | Variable |  |  | 16.35 |  |  |  |
| 20 | -20.087 | 1.50 | 1.673 | 32.0 | 17.13 | 0.599 | 0.009 | Downward |
| 21 | 109.912 | 4.57 | 1.487 | 70.2 | 19.62 | 0.530 | 0.004 | Upward |
| 22 | -29.073 | 7.19 |  |  | 21.25 |  |  |  |
| 23 | -1827.684 | 5.83 | 1.438 | 94.9 | 28.20 | 0.534 | 0.050 | Upward |
| 24 | -30.979 | Variable |  |  | 29.34 |  |  |  |
| 25 | 72.215 | 3.01 | 1.808 | 22.7 | 36.48 | 0.631 | 0.025 | Upward |
| 26 | -421.872 | 1.68 |  |  | 36.46 |  |  |  |
| 27 | ∞ | 30.88 | 1.516 | 64.1 | 40.00 |  |  |  |
| 28 | ∞ | 7.50 | 1.516 | 64.1 | 40.00 |  |  |  |
| 29 | ∞ | 19.50 | 1.805 | 25.4 | 40.00 |  |  |  |
| 30 | ∞ | 6.54 |  |  | 40.00 |  |  |  |

FIG.23

Numerical Example 2 f = 23.1 to 34.9 (Zoom ratio 1.50) ω = 20.6 to 29.5° F/2.80 to 3.60

| | r | d | nd | νd | Effective diameter | θgf | Δθgf | Prism direction |
|---|---|---|---|---|---|---|---|---|
| OBJ | ∞ | 2240.00 | | | | | | |
| 1 | 45.000 | 4.50 | 1.808 | 22.7 | 47.49 | 0.631 | 0.025 | Upward |
| 2 | 28.124 | 9.71 | | | 40.21 | | | |
| *3 | 165.700 | 4.00 | 1.531 | 55.9 | 37.68 | 0.550 | 0.000 | Upward |
| *4 | 35.000 | 13.33 | | | 33.47 | | | |
| 5 | -33.057 | 1.75 | 1.497 | 81.5 | 31.53 | 0.537 | 0.031 | Upward |
| 6 | 51.475 | 8.23 | | | 32.61 | | | |
| 7 | 150.788 | 5.44 | 1.834 | 37.1 | 37.29 | 0.578 | -0.004 | Downward |
| 8 | -65.047 | Variable | | | 37.64 | | | |
| 9 | 53.463 | 3.68 | 1.801 | 34.9 | 36.25 | 0.586 | 0.001 | Downward |
| 10 | -1025.320 | Variable | | | 36.12 | | | |
| 11 | 40.815 | 3.44 | 1.678 | 55.3 | 20.65 | 0.547 | -0.005 | Downward |
| 12 | -44.825 | 1.50 | 1.834 | 37.1 | 20.09 | 0.578 | -0.004 | Upward |
| 13 | 51.665 | 5.09 | | | 18.48 | | | |
| 14 | -185.124 | 1.81 | 1.696 | 55.5 | 16.32 | 0.543 | -0.007 | Downward |
| 15 | -65.606 | 1.00 | | | 15.97 | | | |
| 16Stop SP | ∞ | Variable | | | 15.19 | | | |
| 17 | -60.545 | 1.50 | 1.801 | 33.2 | 15.43 | 0.588 | 0.000 | Downward |
| 18 | 33.056 | 3.23 | 1.487 | 70.2 | 15.93 | 0.530 | 0.004 | Upward |
| 19 | -44.694 | Variable | | | 16.52 | | | |
| 20 | -26.351 | 1.50 | 1.801 | 34.9 | 19.63 | 0.586 | 0.001 | Downward |
| 21 | 55.243 | 5.25 | 1.516 | 64.1 | 22.52 | 0.535 | 0.002 | Upward |
| 22 | -28.992 | 1.00 | | | 23.95 | | | |
| 23 | 88.775 | 5.50 | 1.497 | 81.5 | 28.59 | 0.537 | 0.031 | Upward |
| 24 | -36.010 | Variable | | | 29.19 | | | |
| 25 | 68.122 | 3.87 | 1.808 | 22.7 | 33.28 | 0.631 | 0.025 | Upward |
| 26 | -692.294 | 1.50 | | | 33.16 | | | |
| 27 | ∞ | 30.88 | 1.516 | 64.1 | 40.00 | | | |
| 28 | ∞ | 7.50 | 1.516 | 64.1 | 40.00 | | | |
| 29 | ∞ | 19.50 | 1.805 | 25.4 | 40.00 | | | |
| 30 | ∞ | 2.02 | | | 40.00 | | | |

FIG.24

Numerical Example 3 f = 23.3 to 34.9 (Zoom ratio 1.5) ω = 20.6 to 29.4° F/2.40 to 3.36

|  | r | d | nd | νd | Effective diameter | θgf | Δθgf | Prism direction |
|---|---|---|---|---|---|---|---|---|
| OBJ | ∞ | 2240.00 |  |  |  |  |  |  |
| 1 | 45.000 | 3.50 | 1.808 | 22.7 | 42.76 | 0.631 | 0.025 | Upward |
| 2 | 22.662 | 5.40 |  |  | 35.44 |  |  |  |
| *3 | 100.154 | 3.09 | 1.531 | 55.9 | 35.19 | 0.550 | 0.000 | Upward |
| *4 | 49.409 | 4.66 |  |  | 33.02 |  |  |  |
| 5 | 193.803 | 1.75 | 1.512 | 66.7 | 32.82 | 0.534 | -0.002 | Upward |
| 6 | 48.869 | 7.98 |  |  | 31.94 |  |  |  |
| 7 | -30.316 | 1.75 | 1.497 | 81.5 | 31.93 | 0.537 | 0.031 | Upward |
| 8 | 136.705 | 1.05 |  |  | 34.84 |  |  |  |
| 9 | 114.800 | 7.00 | 1.834 | 37.1 | 35.87 | 0.578 | -0.004 | Downward |
| 10 | -42.157 | 2.00 | 1.487 | 70.2 | 36.23 | 0.530 | 0.004 | Downward |
| 11 | -53.226 | Variable |  |  | 36.44 |  |  |  |
| 12 | 54.390 | 3.08 | 1.801 | 34.9 | 29.81 | 0.586 | 0.001 | Downward |
| 13 | 22974.666 | Variable |  |  | 29.55 |  |  |  |
| 14 | 47.045 | 3.10 | 1.678 | 55.3 | 20.61 | 0.547 | -0.005 | Downward |
| 15 | -45.408 | 1.50 | 1.834 | 37.1 | 20.27 | 0.578 | -0.004 | Upward |
| 16 | 54.206 | 1.65 |  |  | 19.10 |  |  |  |
| 17 | -128.851 | 1.88 | 1.697 | 55.5 | 18.97 | 0.543 | -0.008 | Downward |
| 18 | -60.204 | 1.00 |  |  | 18.78 |  |  |  |
| 19Stop SP | ∞ | Variable |  |  | 18.14 |  |  |  |
| 20 | -52.899 | 3.00 | 1.801 | 34.9 | 21.20 | 0.586 | 0.001 | Downward |
| 21 | 40.489 | 4.13 | 1.487 | 70.2 | 22.72 | 0.530 | 0.004 | Upward |
| 22 | -40.805 | 1.30 |  |  | 23.11 |  |  |  |
| 23 | 1482.177 | 2.42 | 1.697 | 55.5 | 24.34 | 0.543 | -0.008 | Upward |
| 24 | -58.493 | Variable |  |  | 24.58 |  |  |  |
| 25 | -32.981 | 3.75 | 1.673 | 32.0 | 24.63 | 0.599 | 0.009 | Downward |
| 26 | 56.976 | 6.58 | 1.487 | 70.2 | 27.64 | 0.530 | 0.004 | Upward |
| 27 | -129.207 | 1.86 |  |  | 29.97 |  |  |  |
| 28 | 136.627 | 5.78 | 1.438 | 94.9 | 32.81 | 0.534 | 0.050 | Upward |
| 29 | -41.064 | Variable |  |  | 33.35 |  |  |  |
| 30 | 80.678 | 3.30 | 1.808 | 22.7 | 38.15 | 0.631 | 0.025 | Upward |
| 31 | -307.565 | 1.00 |  |  | 38.12 |  |  |  |
| 32 | ∞ | 30.88 | 1.516 | 64.1 | 40.00 |  |  |  |
| 33 | ∞ | 7.50 | 1.516 | 64.1 | 40.00 |  |  |  |
| 34 | ∞ | 19.50 | 1.805 | 25.4 | 40.00 |  |  |  |
| 35 | ∞ | 5.78 |  |  | 40.00 |  |  |  |

FIG.25

Numerical Example 4 f = 23.3 to 34.9 (Zoom ratio 1.5) ω = 20.6 to 29.4° F/2.60 to 3.20

|  | r | d | nd | νd | Effective diameter | θgf | Δθgf | Prism direction |
|---|---|---|---|---|---|---|---|---|
| OBJ | ∞ | 2240.00 |  |  |  |  |  |  |
| 1 | 45.000 | 3.50 | 1.923 | 18.9 | 49.04 | 0.649 | 0.038 | Upward |
| 2 | 31.706 | 5.53 |  |  | 43.30 |  |  |  |
| *3 | 125.000 | 3.83 | 1.531 | 55.9 | 41.20 | 0.550 | 0.000 | Upward |
| *4 | 48.829 | 7.37 |  |  | 36.28 |  |  |  |
| 5 | 151.075 | 1.75 | 1.487 | 70.2 | 35.45 | 0.530 | 0.004 | Upward |
| 6 | 32.054 | 8.94 |  |  | 33.08 |  |  |  |
| 7 | -45.345 | 2.87 | 1.439 | 94.9 | 32.95 | 0.534 | 0.050 | Upward |
| 8 | 110.068 | 2.70 |  |  | 34.16 |  |  |  |
| 9 | 81.563 | 7.75 | 1.801 | 34.9 | 35.44 | 0.586 | 0.001 | Downward |
| 10 | -49.100 | 2.02 | 1.487 | 70.2 | 35.51 | 0.530 | 0.004 | Downward |
| 11 | -261.496 | Variable |  |  | 35.20 |  |  |  |
| 12 | 71.497 | 3.76 | 1.697 | 55.5 | 31.20 | 0.543 | -0.007 | Downward |
| 13 | -115.808 | 1.50 | 1.673 | 38.1 | 30.94 | 0.575 | -0.004 | Downward |
| 14 | -193.446 | Variable |  |  | 30.49 |  |  |  |
| 15 | 33.411 | 4.50 | 1.800 | 29.8 | 25.67 | 0.602 | 0.008 | Downward |
| 16 | 36.283 | 3.15 | 1.762 | 40.1 | 23.28 | 0.576 | 0.000 | Upward |
| 17 | 32.433 | 8.05 |  |  | 21.40 |  |  |  |
| 18 | -53.516 | 2.00 | 1.487 | 70.2 | 18.58 | 0.530 | 0.004 | Downward |
| 19 | -50.505 | 1.00 |  |  | 18.21 |  |  |  |
| 20Stop SP | ∞ | Variable |  |  | 17.29 |  |  |  |
| 21 | -87.264 | 1.56 | 1.801 | 34.9 | 20.36 | 0.586 | 0.001 | Downward |
| 22 | 35.075 | 4.13 | 1.487 | 70.2 | 21.37 | 0.530 | 0.004 | Upward |
| 23 | -52.554 | 1.25 |  |  | 21.99 |  |  |  |
| 24 | -97.371 | 2.75 | 1.487 | 70.2 | 22.87 | 0.530 | 0.004 | Upward |
| 25 | -41.334 | Variable |  |  | 23.57 |  |  |  |
| 26 | -27.595 | 1.50 | 1.800 | 29.8 | 24.12 | 0.602 | 0.008 | Downward |
| 27 | 43.407 | 6.39 | 1.603 | 60.6 | 28.12 | 0.541 | 0.000 | Upward |
| 28 | -39.558 | 1.84 |  |  | 29.15 |  |  |  |
| 29 | 74.934 | 7.25 | 1.438 | 94.9 | 34.63 | 0.534 | 0.050 | Upward |
| 30 | -42.155 | Variable |  |  | 35.14 |  |  |  |
| 31 | 77.256 | 3.83 | 1.923 | 18.8 | 39.70 | 0.649 | 0.038 | Upward |
| 32 | 1576.545 | 3.64 |  |  | 40.00 |  |  |  |
| 33 | ∞ | 30.88 | 1.516 | 64.1 | 40.00 |  |  |  |
| 34 | ∞ | 7.50 | 1.516 | 64.1 | 40.00 |  |  |  |
| 35 | ∞ | 19.50 | 1.805 | 25.4 | 40.00 |  |  |  |
| 36 | ∞ | 1.50 |  |  | 40.00 |  |  |  |

FIG.26

Numerical Example 5 f = 23.3 ω = 29.4° F/2.60

|  | r | d | nd | νd | Effective diameter | θgf | Δθgf | Prism direction |
|---|---|---|---|---|---|---|---|---|
| OBJ | ∞ | 2240.00 |  |  |  |  |  |  |
| 1 | 45.000 | 3.18 | 1.808 | 22.7 | 42.26 | 0.631 | 0.025 | Upward |
| 2 | 25.003 | 9.49 |  |  | 36.11 |  |  |  |
| *3 | 342.121 | 4.00 | 1.531 | 55.9 | 34.43 | 0.550 | 0.000 | Upward |
| *4 | 36.734 | 9.69 |  |  | 31.09 |  |  |  |
| 5 | -31.923 | 2.69 | 1.497 | 81.5 | 30.81 | 0.537 | 0.031 | Upward |
| 6 | 98.033 | 3.91 |  |  | 32.73 |  |  |  |
| 7 | 170.092 | 6.01 | 1.834 | 37.1 | 34.62 | 0.578 | -0.004 | Downward |
| 8 | -51.967 | 40.97 |  |  | 35.03 |  |  |  |
| 9 | 62.474 | 3.05 | 1.801 | 34.9 | 29.29 | 0.586 | 0.001 | Downward |
| 10 | -338.615 | 29.88 |  |  | 29.04 |  |  |  |
| 11 | 90.770 | 3.31 | 1.678 | 55.3 | 16.66 | 0.547 | -0.005 | Downward |
| 12 | -23.672 | 1.50 | 1.834 | 37.1 | 16.26 | 0.578 | -0.004 | Upward |
| 13 | 277.441 | 1.82 |  |  | 15.94 |  |  |  |
| 14 | -68.901 | 2.00 | 1.697 | 55.5 | 15.76 | 0.543 | -0.008 | Downward |
| 15 | -33.082 | 1.00 |  |  | 15.78 |  |  |  |
| 16Stop SP | ∞ | 1.00 |  |  | 15.12 |  |  |  |
| 17 | -96.589 | 2.29 | 1.801 | 34.9 | 15.29 | 0.586 | 0.001 | Downward |
| 18 | 26.012 | 3.37 | 1.487 | 70.2 | 15.85 | 0.530 | 0.004 | Downward |
| 19 | -52.438 | 2.67 |  |  | 16.35 |  |  |  |
| 20 | -20.087 | 1.50 | 1.673 | 32.0 | 17.13 | 0.599 | 0.009 | Downward |
| 21 | 109.912 | 4.57 | 1.487 | 70.2 | 19.62 | 0.530 | 0.004 | Upward |
| 22 | -29.073 | 7.19 |  |  | 21.25 |  |  |  |
| 23 | -1827.684 | 5.83 | 1.438 | 94.9 | 28.20 | 0.534 | 0.050 | Upward |
| 24 | -30.979 | 1.00 |  |  | 29.34 |  |  |  |
| 25 | 72.215 | 3.01 | 1.808 | 22.7 | 36.48 | 0.631 | 0.025 | Upward |
| 26 | -421.872 | 1.68 |  |  | 36.46 |  |  |  |
| 27 | ∞ | 30.88 | 1.516 | 64.1 | 40.00 |  |  |  |
| 28 | ∞ | 7.50 | 1.516 | 64.1 | 40.00 |  |  |  |
| 29 | ∞ | 19.50 | 1.805 | 25.4 | 40.00 |  |  |  |
| 30 | ∞ | 6.54 |  |  | 40.00 |  |  |  |

FIG.27

[Table 1]

| Conditional equation | First exemplary embodiment | Second exemplary embodiment | Third exemplary embodiment | Fourth exemplary embodiment | Fifth exemplary embodiment |
|---|---|---|---|---|---|
| (1) | 0.025 | 0.025 | 0.025 | 0.038 | 0.025 |
| (2) | 0.031 | 0.031 | 0.031 | 0.050 | 0.031 |
| (3) | 0.025 | 0.025 | 0.025 | 0.038 | 0.025 |
| (4) | 0.050 | 0.031 | 0.050 | 0.050 | 0.050 |
| (5) | 58.8 | 58.8 | 58.8 | 76.0 | 58.8 |
| (6) | 72.2 | 58.8 | 72.2 | 76.0 | 72.2 |
| (7) | 0.014 | 0.015 | 0.002 | 0.018 | 0.014 |
| (8) | -0.003 | 0.006 | 0.007 | 0.006 | -0.003 |
| (9) | 0.419 | 0.465 | 0.556 | 0.608 | 0.419 |

PROJECTION OPTICAL SYSTEM AND IMAGE PROJECTION APPARATUS INCLUDING THE SAME

BACKGROUND OF THE INVENTION

Field of the Invention

The present invention relates to a projection optical system such as one suitable as a projection optical system for use in an image projection apparatus (projector) enlarging and projecting an image on a screen.

Description of the Related Art

Conventionally, various image projection apparatuses (projectors) using an image display element such as a liquid crystal display element and enlarging and projecting an image consisting of the image display element on a screen with use of a projection optical system have been discussed. The projection optical system for use in the projector is desired to be a zoom lens enabling projection at various magnifications and having a wide viewing angle and high optical performance sufficient to enable the image to be projected on a large screen at close range, as well as a projection optical system having a fixed focal length. To arrange a color separation optical system and a color combining optical system between the projection optical system and the image display element, the projection optical system is also desired to have a long back focus and have favorable telecentricity.

Conventionally, zoom lenses for the projector having a wide viewing angle, a long back focus, and favorable telecentricity are known (US2011/0109976, US2009/0195884, US2005/0200967). Each of the zoom lenses discussed in these conventional techniques includes a first to sixth lens units respectively having negative, positive, positive, negative, positive, and positive refractive power in this order from an enlargement conjugate side to a reduction conjugate side. These conventional techniques also discuss a zoom lens having a wide viewing angle in which the first and sixth lens units do not move while the second to fifth lens units move at the time of zooming.

SUMMARY OF THE INVENTION

A projection optical system having a zooming function according to the present invention includes a plurality of positive lenses and a plurality of negative lenses, and an aperture stop arranged between a negative lens A arranged closest to an enlargement conjugate side out of the plurality of negative lenses and a positive lens C arranged closest to a reduction conjugate side out of the plurality of positive lenses. When a negative lens arranged at a position closest to the aperture stop, among negative lenses whose lens surfaces are arranged in a range up to a position separated in 0.22 L to the reduction conjugate side from a vertex of a lens surface arranged closest to the enlargement conjugate side both at a wide angle end and at a telephoto end is referred to as a negative lens B when a distance from the vertex of the lens surface arranged closest to the enlargement conjugate side to a vertex of a lens surface arranged closest to the reduction conjugate side is referred to as a total optical length L, when a positive lens arranged at a position closest to the aperture stop, among positive lenses whose lens surfaces are arranged in a range up to a position separated in 0.29 L to the enlargement conjugate side from the vertex of the lens surface arranged closest to the reduction conjugate side both at the wide angle end and at the telephoto end is referred to as a positive lens D, when a refractive index for a d line (wavelength: 587.6 nm) of a material is referred to as Nd, when a refractive index for an F line (wavelength: 486.1 nm) of a material is referred to as NF, when a refractive index for a g line (wavelength: 435.8 nm) of a material is referred to as Ng, when a refractive index for a C line (wavelength: 656.3 nm) of a material is referred to as Nc, when an Abbe number $\nu d$, a partial dispersion ratio $\theta gF$, and anomalous dispersion $\Delta \theta gF$ are defined as $\nu d = (Nd-1)/(NF-NC)$ $\theta gF = (Ng-NF)/(NF-NC)$ $\Delta\theta gF = \theta gF - (0.6438 - 0.001682\, \nu d)$, when the Abbe number and the anomalous dispersion of a material for the negative lens A are referred to as $\nu d A$ and $\Delta\theta gFA$, respectively, when the Abbe number and the anomalous dispersion of a material for the negative lens B are referred to as $\nu dB$ and $\Delta\theta gFB$, respectively, when the Abbe number and the anomalous dispersion of a material for the positive lens C are referred to as $\nu dC$ and $\Delta\theta gFC$, respectively, and when the Abbe number and the anomalous dispersion of a material for the positive lens D are referred to as $\nu dD$ and $\Delta\theta gFD$, respectively, conditional equations of $0.020 < \Delta\theta gFA < 0.040$ $0.030 < \Delta\theta gFB < 0.055$ $0.020 < \Delta\theta gFC < 0.040$ $0.030 < \Delta\theta gFD < 0.055$ $\nu dB - \nu dA > 55.0$ $\nu dD - \nu dC > 55.0$ are satisfied.

A projection optical system according to the present invention includes a plurality of positive lenses and a plurality of negative lenses, and an aperture stop arranged between a negative lens A arranged closest to an enlargement conjugate side out of the plurality of negative lenses and a positive lens C arranged closest to a reduction conjugate side out of the plurality of positive lenses. When a negative lens arranged at a position closest to the aperture stop, among negative lenses whose lens surfaces are arranged in a range up to a position separated in 0.22 L to the reduction conjugate side from a vertex of a lens surface arranged closest to the enlargement conjugate side is referred to as a negative lens B when a distance from the vertex of the lens surface arranged closest to the enlargement conjugate side to a vertex of a lens surface arranged closest to the reduction conjugate side is referred to as a total optical length L, when a positive lens arranged at a position closest to the aperture stop, among positive lenses whose lens surfaces are arranged in a range up to a position separated in 0.135 L to the enlargement conjugate side from the vertex of the lens surface arranged closest to the reduction conjugate side is referred to as a positive lens D, when a refractive index for a d line (wavelength: 587.6 nm) of a material is referred to as Nd, when a refractive index for an F line (wavelength: 486.1 nm) of a material is referred to as NF, when a refractive index for a g line (wavelength: 435.8 nm) of a material is referred to as Ng, when a refractive index for a C line (wavelength: 656.3 nm) of a material is referred to as Nc, when an Abbe number $\nu d$, a partial dispersion ratio $\theta gF$, and anomalous dispersion $\Delta\theta gF$ are defined as $\nu d = (Nd-1)/(NF-NC)$ $\theta gF = (Ng-NF)/(NF-NC)$ $\Delta\theta gF = \theta gF - (0.6438 - 0.001682\, \nu d)$, when the Abbe number and the anomalous dispersion of a material for the negative lens A are referred to as vdA and ΔθgFA, respectively, when the Abbe number and the anomalous dispersion of a material for the negative lens B are referred to as vdB and ΔθgFB, respectively, when the Abbe number and the anomalous dispersion of a material for the positive lens C are referred to as vdC and ΔθgFC, respectively, and when the Abbe number and the anomalous dispersion of a material for the positive lens D are referred to as vdD and ΔθgFD, respectively, conditional equations of 0.020<ΔθgFA<0.040

0.030<ΔθgFB<0.055

0.020<ΔθgFC<0.040

0.030<ΔθgFD<0.055 vdB−vdA>55.0 vdD−vdC>55.0 are satisfied.

Further features of the present invention will become apparent from the following description of exemplary embodiments with reference to the attached drawings.

BRIEF DESCRIPTION OF THE DRAWINGS

FIGS. 1A and 1B are lens cross-sectional views at a wide angle end and at a telephoto end of a first exemplary embodiment of the present invention.

FIGS. 2A and 2B are various aberration diagrams at the wide angle end and at the telephoto end of a zoom lens according to the first exemplary embodiment when an object distance is 2.24 m.

FIGS. 3A and 3B are lateral chromatic aberration diagrams at the wide angle end and at the telephoto end of the zoom lens according to the first exemplary embodiment when the object distance is 2.24 m.

FIGS. 12A and 12B are lens cross-sectional views at the wide angle end and at the telephoto end of a third exemplary embodiment of the present invention.

FIGS. 15A and 15B are lens cross-sectional views at the wide angle end and at the telephoto end of a fourth exemplary embodiment of the present invention.

FIGS. 16A and 16B are various aberration diagrams at the wide angle end and at the telephoto end of a zoom lens according to the fourth exemplary embodiment when an object distance is 2.24 m.

FIG. 22 illustrates data related to Numerical Example 1.

FIG. 23 illustrates data related to Numerical Example 2.

FIG. 24 illustrates data related to Numerical Example 3.

FIG. 25 illustrates data related to Numerical Example 4.

FIG. 26 illustrates data related to Numerical Example 5.

FIG. 27 illustrates Table 1.

DESCRIPTION OF THE EMBODIMENTS

Figure 4:
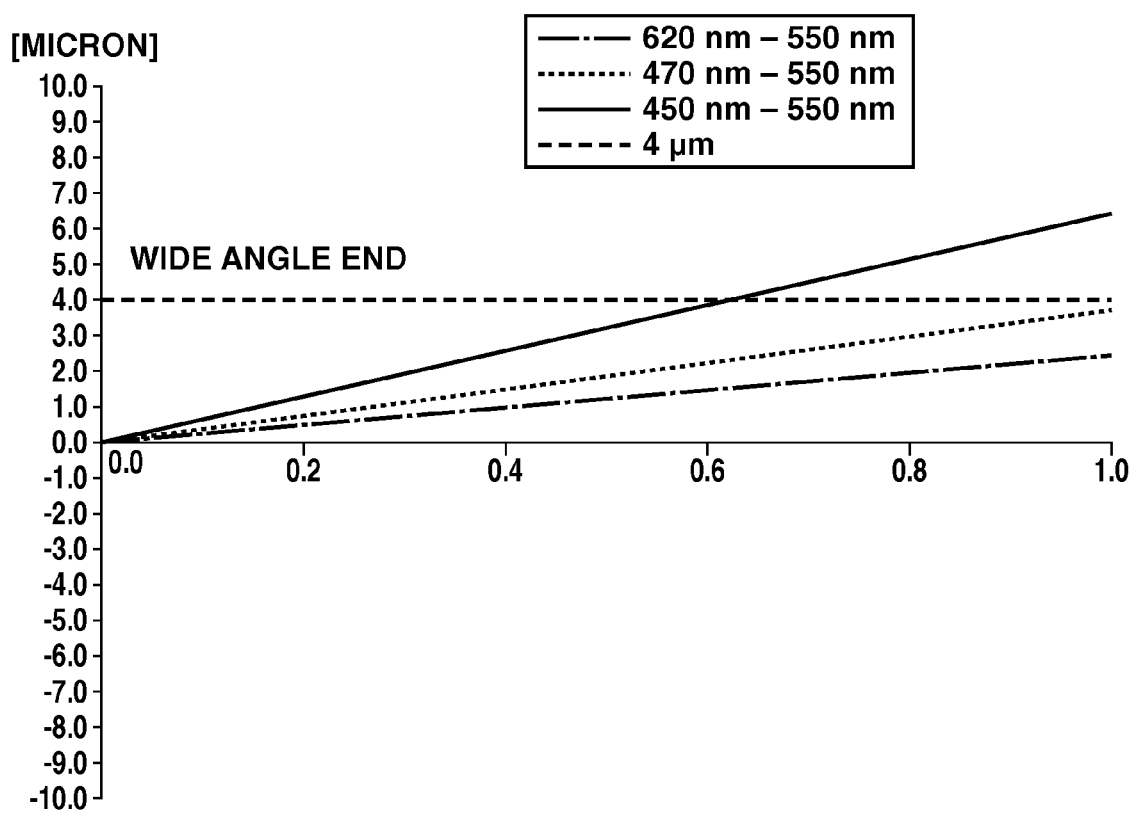
FIG. 4 is a lateral chromatic aberration diagram at the wide angle end of a conventional zoom lens.

A projection optical system for use in a projector is strongly desired to enable projection at a wide viewing angle and provide a high-quality projection image. To provide the high-quality image, it is important to favorably correct various kinds of aberration, chromatic aberration in particular. To project the high-quality image having a wide viewing angle and having less chromatic aberration, it is important to perform appropriate settings for a zoom type and a lens configuration of each lens unit in a case of a zoom lens and a lens configuration of each lens in a case of a projection optical system having a fixed focal length.

Particularly, in the zoom lens, to suppress variation in chromatic aberration at the time of zooming and project a high-quality image in the entire zoom range, it is important to appropriately set a material for each lens constituting the lens units. For example, it is necessary to appropriately set a material for each lens of lens units on an enlargement conjugate side and a reduction conjugate side and lens units arranged near an aperture stop. When these settings are inappropriate, correction of lateral chromatic aberration will particularly be difficult. This causes an increase of variation in chromatic aberration at the time of zooming, which leads to a difficulty in obtaining high optical performance over the entire zoom range.

The present invention is directed to a projection optical system having a wide viewing angle, having less chromatic aberration, and enabling favorable optical performance to be obtained easily. Hereinbelow, exemplary embodiments of the present invention will be described in detail based on the attached drawings. The projection optical system according to the present invention includes a plurality of positive lenses and a plurality of negative lenses. The projection optical system is a zoom lens or an optical system having a fixed focal length. To correct chromatic aberration mainly in a favorable manner, characteristics of a part of the plurality of positive lenses and a part of the plurality of negative lenses constituting the specified projection optical system are as follows.

A negative lens arranged closest to an enlargement conjugate side out of the plurality of negative lenses is referred to as a negative lens A. A positive lens arranged closest to a reduction conjugate side out of the plurality of positive lenses is referred to as a positive lens C. An aperture stop is provided between the negative lens A and the positive lens C. A distance from a vertex of a lens surface arranged closest to the enlargement conjugate side to a vertex of a lens surface arranged closest to the reduction conjugate side is referred to as a total optical length L. If it is stated in detail, the total optical length L is not optical distance but physical distance between the vertex of the lens surface arranged closest to the enlargement conjugate side and the vertex of the lens surface closest to the reduction conjugate side. Specifically, the total optical length L is the sum of the thicknesses of all of the lenses and all the lens intervals.

A negative lens whose lens surfaces are arranged in a range up to a position separated in 0.22 L to the reduction conjugate side from the vertex of the lens surface arranged closest to the enlargement conjugate side and which is arranged at a position closest to the aperture stop is referred to as a negative lens B. A positive lens whose lens surfaces are arranged in a range up to a position separated in 0.29 L to the enlargement conjugate side from the vertex of the lens surface arranged closest to the reduction conjugate side and which is arranged at a position closest to the aperture stop is referred to as a positive lens D. At this time, materials for the negative lens A, the negative lens B, the positive lens C, and the positive lens D are appropriately set so that conditional equations to be described below may be satisfied.

First to fourth exemplary embodiments of the present invention are cases in which a projection optical system is a zoom lens. A fifth exemplary embodiment is a case in which a projection optical system has a fixed focal length. In the case in which the projection optical system is the zoom lens, characteristics of a lens configuration thereof are described based on a zoom position at a wide angle end.

Figure 5:
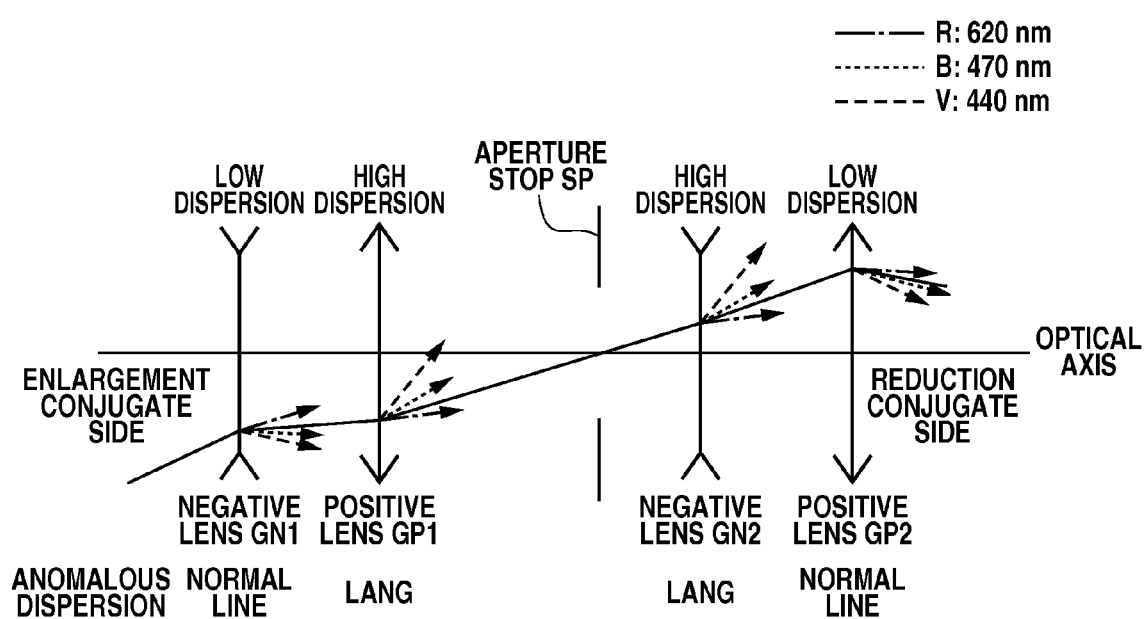
FIG. 5 is a schematic view of a general glass configuration in the conventional zoom lens.

Next, the case in which the projection optical system according to the present invention is the zoom lens will be mainly described. In many cases, a negative-lead type zoom lens uses a low dispersion material for a negative lens GN1 and a high dispersion material for a positive lens GP1 on the enlargement conjugate side when viewed from an aperture stop SP as illustrated in FIG. 5. The negative-lead type zoom lens also uses a high dispersion material for a negative lens GN2 and a low dispersion material for a positive lens GP2 on the reduction conjugate side when viewed from the aperture stop SP.

At the bottom of FIG. 5, terms "normal line" and "lang" are written to express anomalous dispersion of materials, and definitions of these terms will be described below. In FIG. 5, R has a wavelength of 620 nm, B has a wavelength of 470 nm, and V has a wavelength of 440 nm. In a case illustrated in FIG. 5, an off-axis principal ray passes through the lens system to pass through a center of the aperture stop SP. In this case, in the negative lens GN1 using the low dispersion material arranged further on the enlargement conjugate side when viewed from the aperture stop SP and the positive lens GP2 using the low dispersion material arranged further on the reduction conjugate side when viewed from the aperture stop SP, a blue lowering effect is generated due to an upward prism component. A blue lowering effect means that blue light B is guided to the direction away from the optical axis at the area below the optical axis in the drawing sheet, and that blue light B is guided to the direction approaching the optical axis at the area above the optical axis in the drawing sheet.

Figure 6:
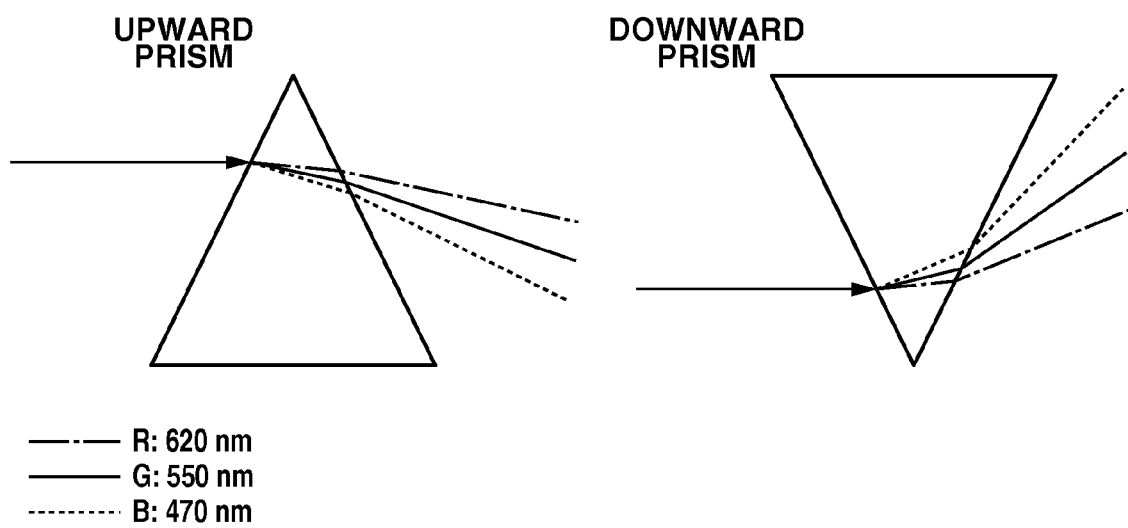
FIG. 6 is a schematic view of an upward prism component and a downward prism component.

Conversely, in the positive lens GP1 using the high dispersion material arranged on the enlargement conjugate side when viewed from the aperture stop SP and the negative lens GN2 using the high dispersion material arranged on the reduction conjugate side when viewed from the aperture stop SP, a blue raising effect is generated due to a downward prism component. A blue raising effect means that blue light B is guided to the direction approaching the optical axis at the area below the optical axis in the drawing sheet, and that blue light B is guided to the direction away from the optical axis at the area above the optical axis in the drawing sheet. Schematic views of the upward prism component and the downward prism component are illustrated in FIG. 6 for reference. In the optical path which is vertically symmetrically holding the optical axis with the optical path described in FIG. 5, the relationship between the blue raising effect and the blue lowering effect is reversed. For example, blue lowering effect is occurred at the negative lens GN1 in the optical path described in FIG. 5, but blue raising effect is occurred at the negative lens GN1 in the optical path which is vertically symmetrically holding the optical axis with the optical path described in FIG. 5.

In FIG. 6, G has a wavelength of 550 nm. At this time, in the lens system, a material which is highly dispersive and has a high value for a partial dispersion ratio $\theta gF$ (a definition thereof will be described below) is used for a lens having the downward prism component while a material which is less dispersive and has a low value for the partial dispersion ratio $\theta gF$ is used for a lens having the upward prism component. This causes a difference between the partial dispersion ratios of the upward prism component and the downward prism component to be increased, and the blue raising effect due to the downward prism component is generated more strongly than the blue lowering effect due to the upward prism component.

As a result, the blue raising effect remains significantly in the entire lens system. In an aberration diagram, blue lateral chromatic aberration in particular is generated on the reduction conjugate side to an over direction.

Figure 8:
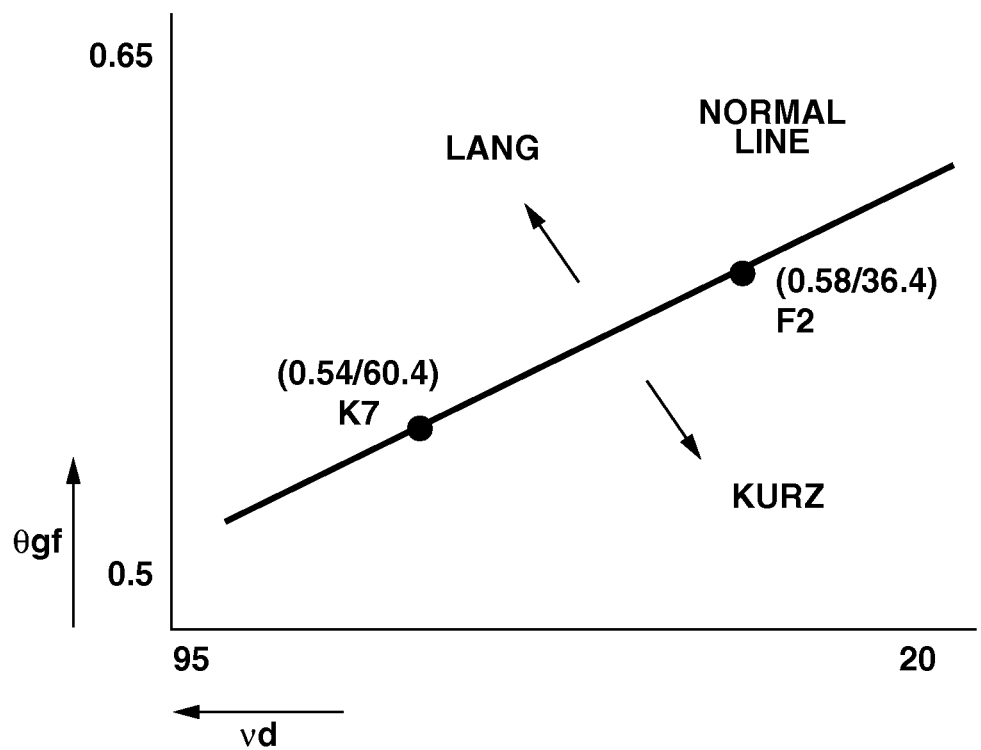
FIG. 8 is a schematic view of lang and kurz in glass materials.

Based on the above general lens configuration and problem, a configuration of a zoom lens according to each of the aforementioned conventional techniques will be described. In the zoom lens described in US2009/0195884 and US2005/0200967, a low dispersion anomalous dispersion material and a high dispersion anomalous dispersion material are used for a positive lens which is further located on a reduction conjugate side when viewed from an aperture stop SP and in which an incident height from an optical axis of an off-axis principal ray is high. Here, the low dispersion anomalous dispersion material and the high dispersion anomalous dispersion material will be described. As illustrated in FIG. 8, a straight line connecting two points for a trade name "K7 glass" and a trade name "F2 glass" on a glass catalog of SCHOTT AG is referred to as a normal line for the partial dispersion ratio $\theta gF$, for example.

At this time, the low dispersion anomalous dispersion material means a material whose Abbe number is high and which is less dispersive, among materials located still further on an upper side than a point on the normal line corresponding to a dispersion value and called "lang." As illustrated in FIG. 8, the straight line connecting the two points for the trade name "K7 glass" and the trade name "F2 glass" on the glass catalog of SCHOTT AG is referred to as the normal line for $\theta gF$. At this time, the high dispersion anomalous dispersion material means a material whose Abbe number is low and which is highly dispersive, among the materials located still further on the upper side than the point on the normal line corresponding to the dispersion value and called "lang."

Contrary to these glass materials, materials located still further on a lower side than the point on the normal line are called "kurz." The graph in FIG. 8 illustrates schematic views of the lang, the kurz, and below-mentioned anomalous dispersion $\Delta\theta gF$.

By using the two aforementioned anomalous dispersion materials for the positive lens which is further located on the reduction conjugate side when viewed from the aperture stop SP and in which the incident height from the optical axis of the off-axis principal ray is high, the blue lowering effect due to the upward prism component is significantly generated. The zoom lens is configured so that this blue lowering effect can suppress the blue raising effect due to the downward prism component remaining in the entire optical system. Also, in a zoom lens described in US2011/0109976, the aforementioned low dispersion anomalous dispersion material and high dispersion anomalous dispersion material are used for a negative lens which is further located on an enlargement conjugate side when viewed from the aperture stop SP and in which the incident height from the optical axis of the off-axis principal ray is high, as well as for the positive lens which is further located on the reduction conjugate side when viewed from the aperture stop SP and in which the incident height from the optical axis of the off-axis principal ray is high.

Accordingly, the zoom lens is configured to generate the blue lowering effect due to the upward prism component more significantly both in a front lens or in a rear lens of the optical system to obtain an effect of cancelling the blue raising effect due to the downward prism component generated in the entire optical system. However, in any of the examples, achromatic balance for correcting the blue raising effect due to the downward prism component in the entire optical system is not necessarily sufficient, and consequently, the blue lateral chromatic aberration remains on the reduction conjugate side about 5 μm to the over direction in the entire optical system.

When application of the optical system to a much higher resolution projector represented by 4K resolution is considered, the correction of the lateral chromatic aberration needs to be improved since a size of each pixel is reduced further than in a conventional projector, and chromatic aberration becomes more outstanding.

The present invention is directed to a projection optical system reducing lateral chromatic aberration further than in a conventional projection optical system while securing a size of the entire optical system and a configuration of a back focus.

FIGS. 1A and 1B are lens cross-sectional views at a wide angle end (short focal length end) and at a telephoto end (long focal length end) of the first exemplary embodiment of a zoom lens according to the present invention. FIGS. 2A and 2B are aberration diagrams at the wide angle end and at the telephoto end of the first exemplary embodiment of the zoom lens according to the present invention when an object distance (projection distance) is 2.24 m. Note that an object distance is a distance when below-mentioned numerical examples are expressed in units of mm. The same is true below. FIGS. 3A and 3B are lateral chromatic aberration diagrams at the wide angle end and at the telephoto end of the first exemplary embodiment of the zoom lens according to the present invention when the object distance is 2.24 m.

FIG. is a lateral chromatic aberration diagram at the wide angle end of a conventional example when a focal length is set to be equal to that of the first exemplary embodiment.

Figure 7:
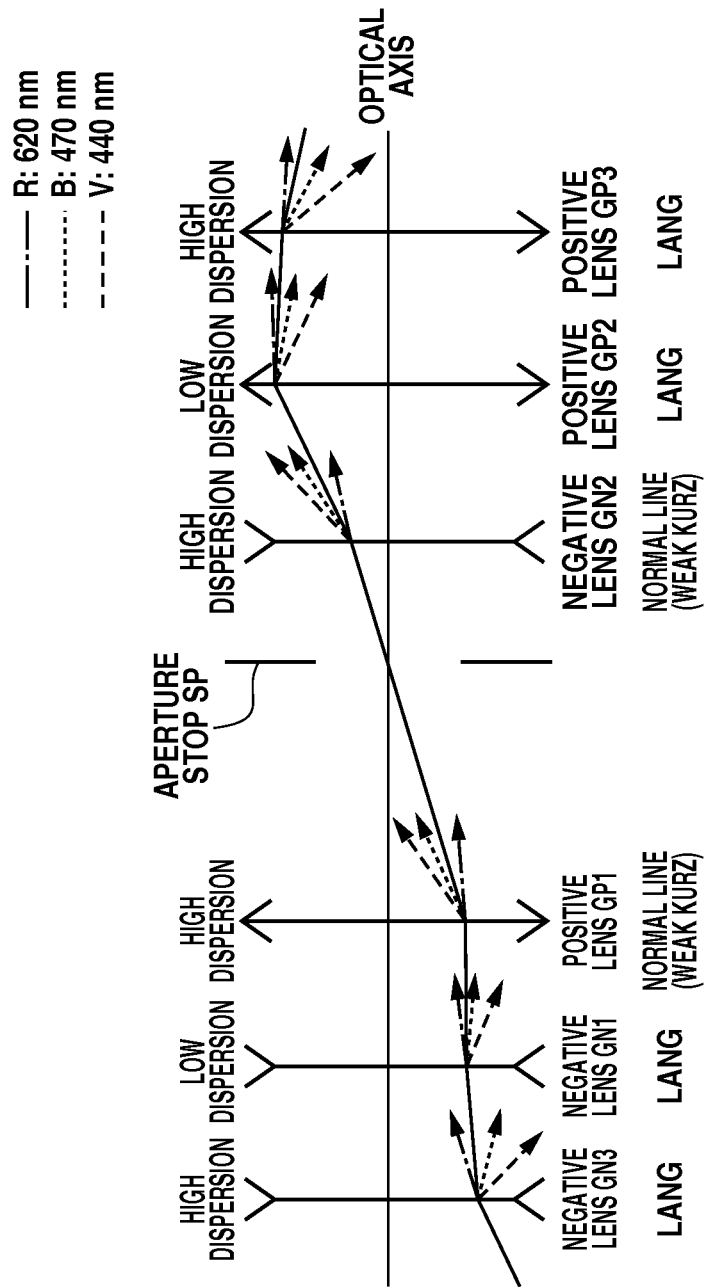
FIG. 7 is a schematic view of a glass configuration in a zoom lens of the present invention.

FIG. 5 is a schematic view of a general glass configuration in a conventional negative-lead type zoom lens. FIG. 6 is a schematic view of an upward prism component and a downward prism component. FIG. 7 is a schematic view of a glass configuration in a negative-lead type zoom lens according to the present invention. FIG. 8 is a schematic view of lang and kurz in glass materials.

Figures 9A, 9B:
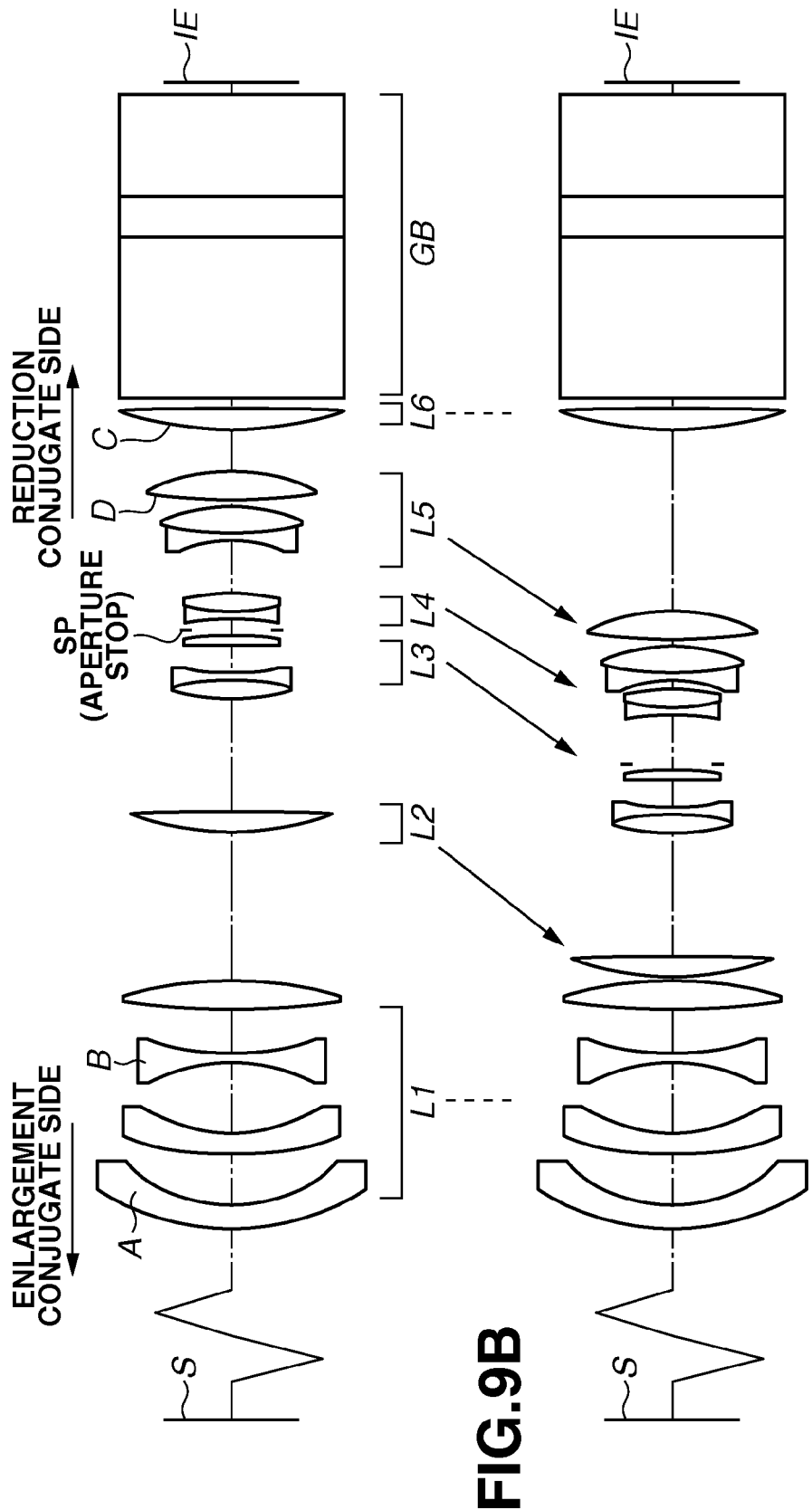
FIGS. 9A and 9B are lens cross-sectional views at the wide angle end and at the telephoto end of a second exemplary embodiment of the present invention.
Figure 10A:
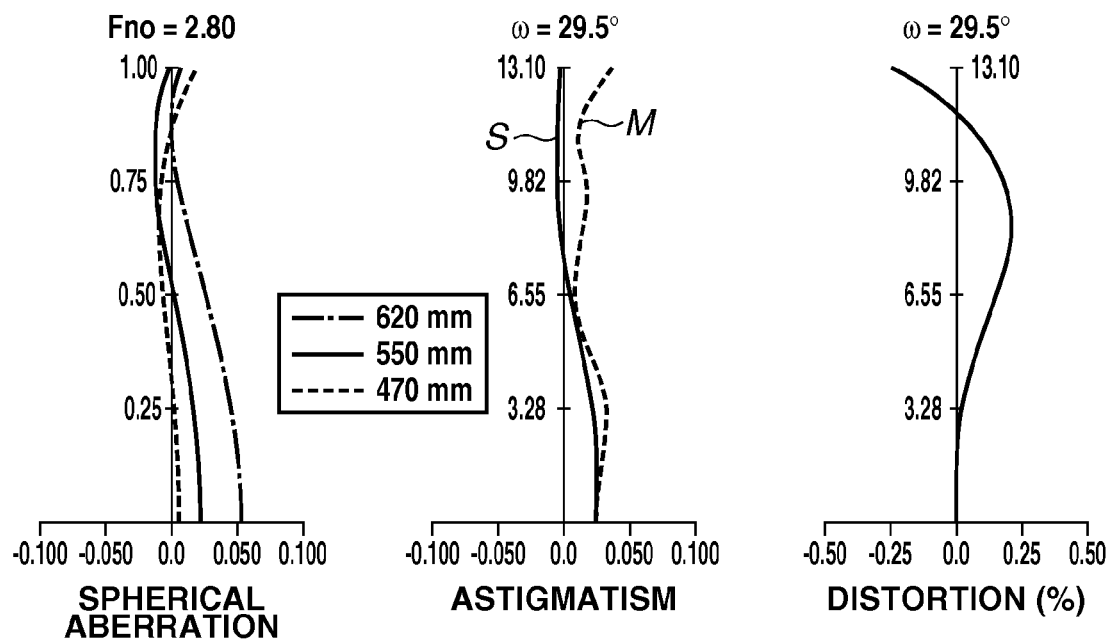
FIGS. 10A and 10B are various aberration diagrams at the wide angle end and at the telephoto end of a zoom lens as the second exemplary embodiment when an object distance is 2.24 m.
Figure 10B:
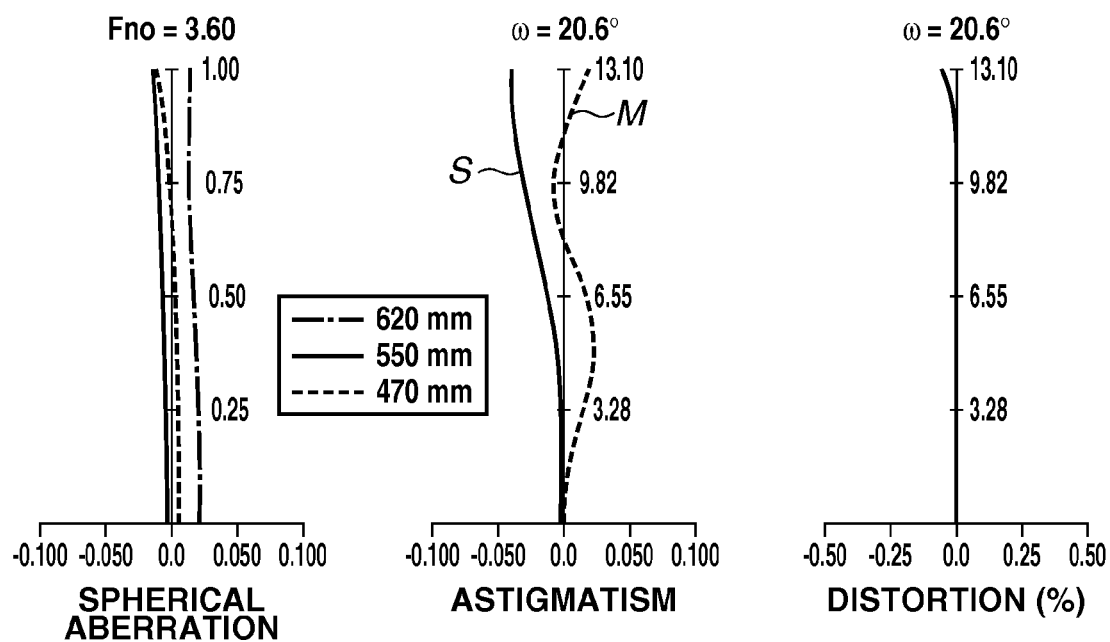
Figure 11A:
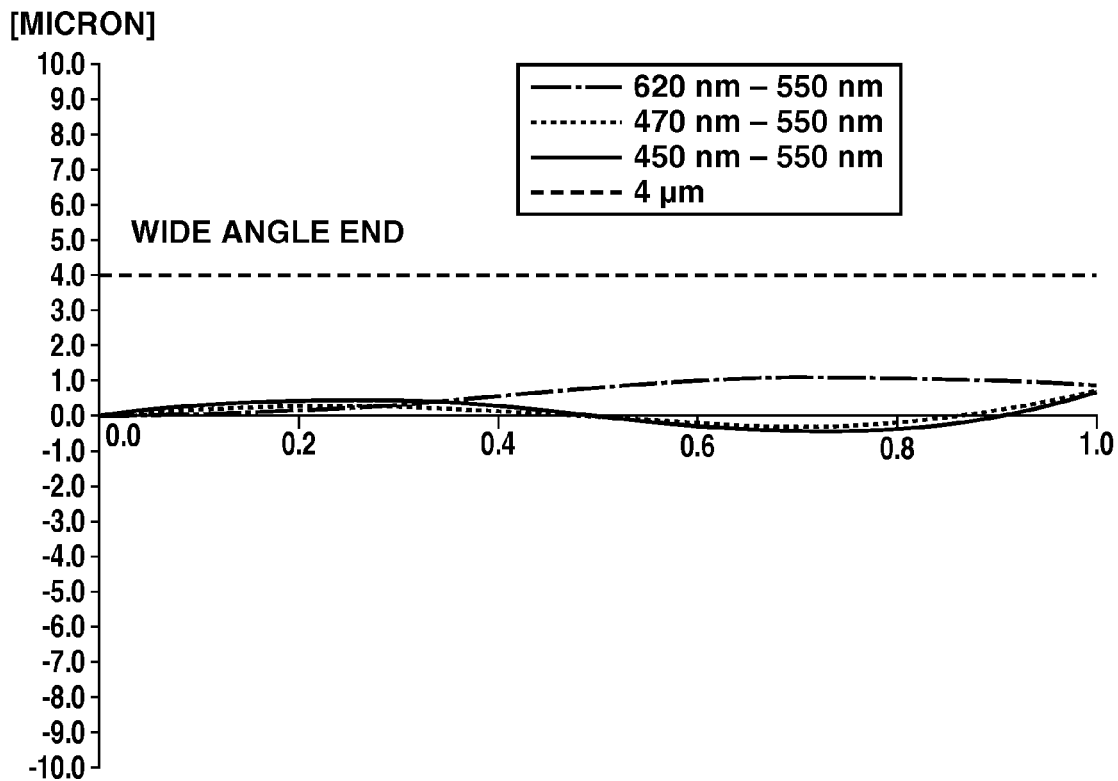
FIGS. 11A and 11B are lateral chromatic aberration diagrams at the wide angle end and at the telephoto end of the zoom lens according to the second exemplary embodiment when the object distance is 2.24 m.
Figure 11B:
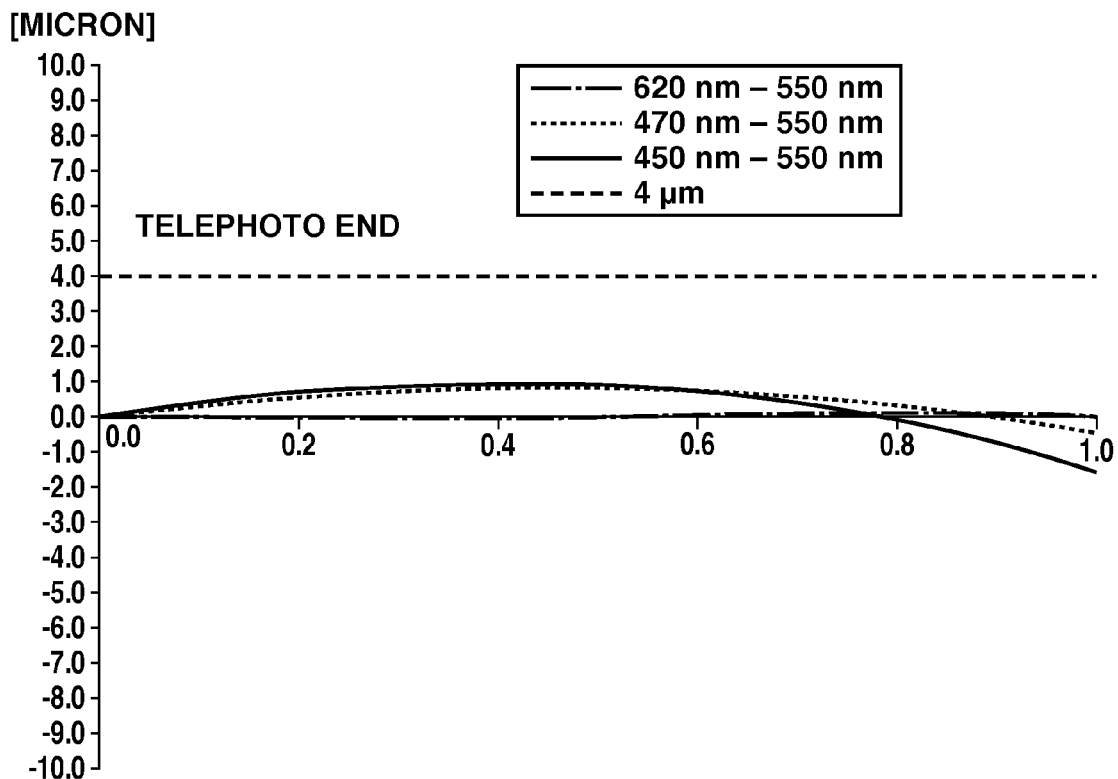

FIGS. 9A and 9B are lens cross-sectional views at the wide angle end and at the telephoto end of the second exemplary embodiment of the zoom lens according to the present invention. FIGS. 10A and 10B are aberration diagrams at the wide angle end and at the telephoto end of the second exemplary embodiment of the zoom lens according to the present invention when the object distance is 2.24 m. FIGS. 11A and 11B are lateral chromatic aberration diagrams at the wide angle end and at the telephoto end of the second exemplary embodiment of the zoom lens according to the present invention when the object distance is 2.24 m.

Figure 13A:
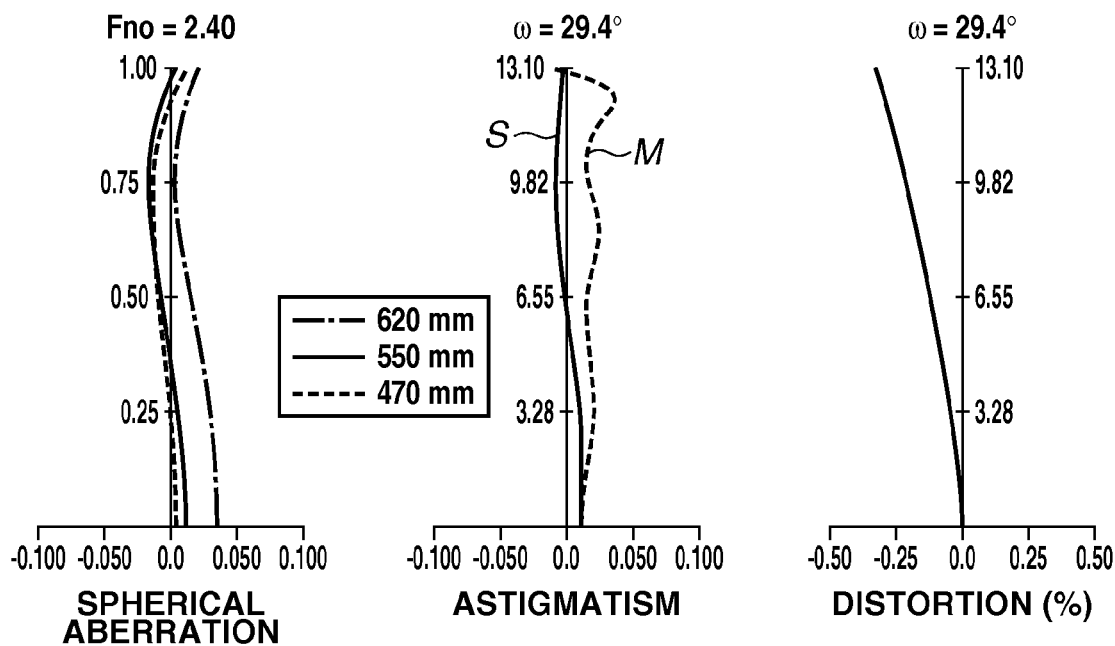
FIGS. 13A and 13B are various aberration diagrams at the wide angle end and at the telephoto end of a zoom lens according to the third exemplary embodiment when an object distance is 2.24 m.
Figure 13B:
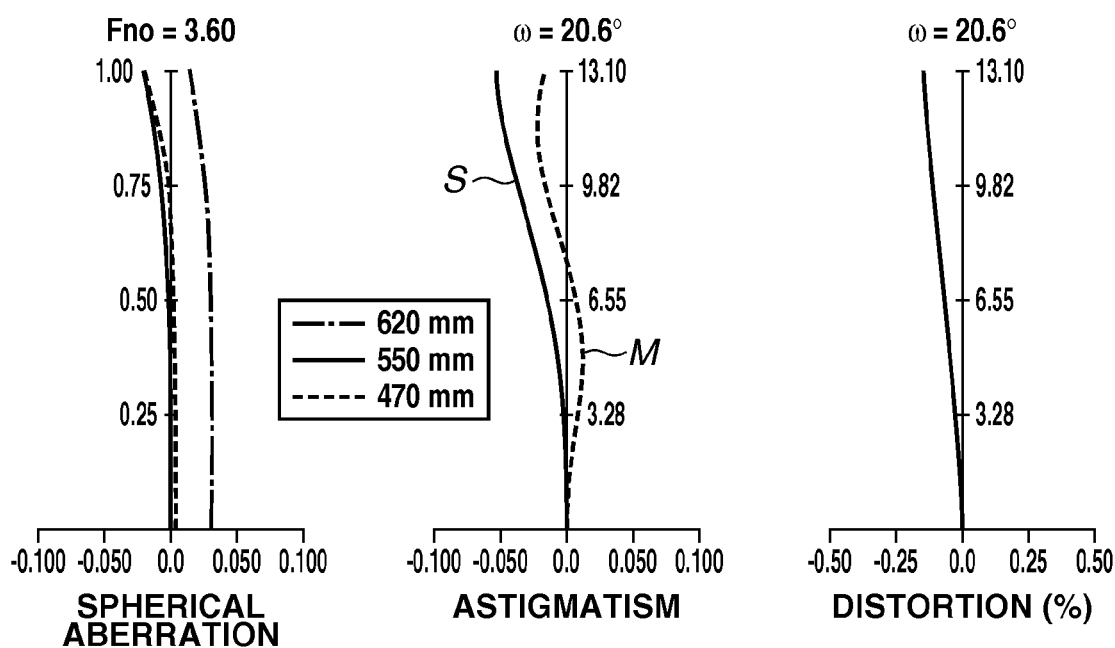
Figure 14A:
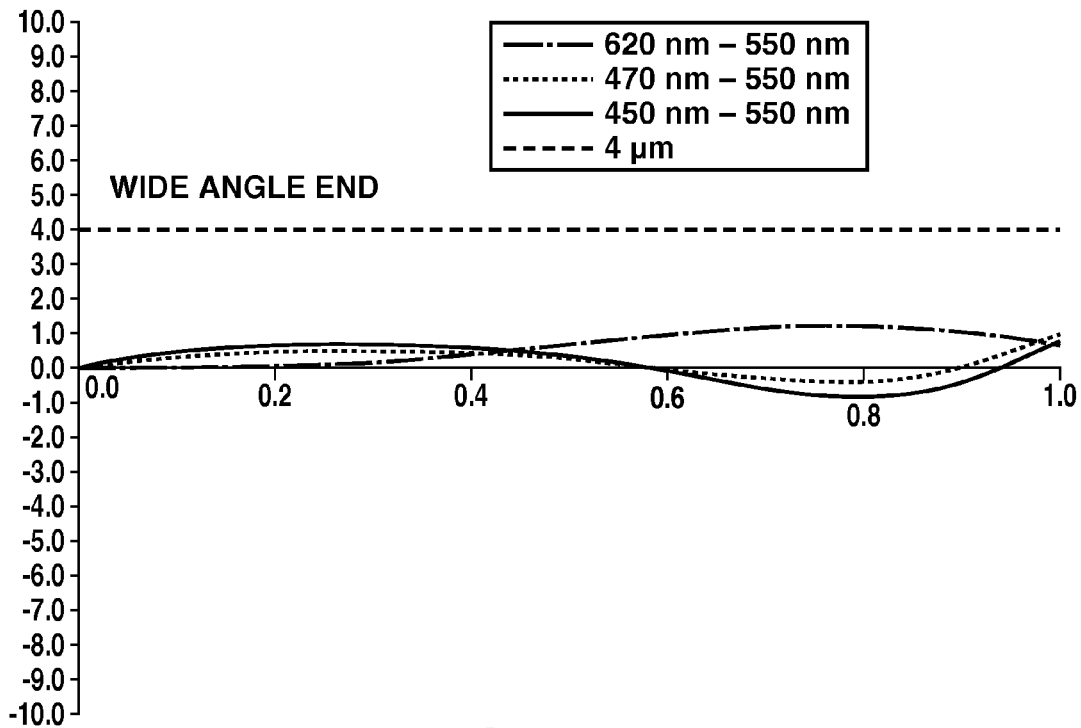
FIGS. 14A and 14B are lateral chromatic aberration diagrams at the wide angle end and at the telephoto end of the zoom lens according to the third exemplary embodiment when the object distance is 2.24 m.
Figure 14B:
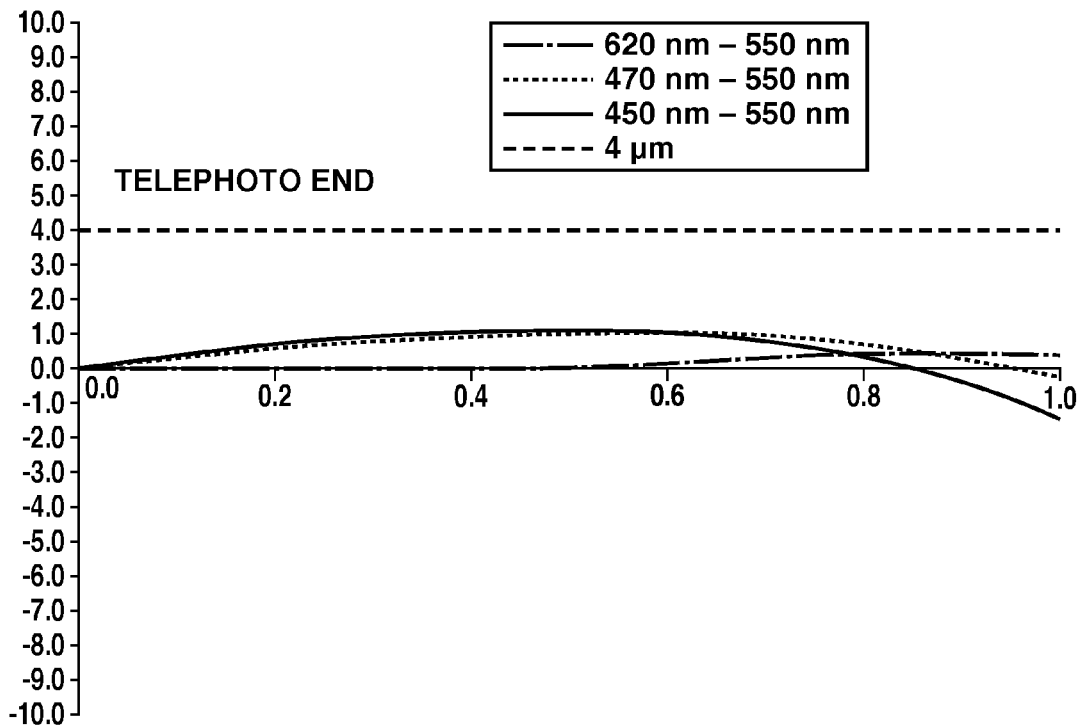

FIGS. 12A and 12B are lens cross-sectional views at the wide angle end and at the telephoto end of the third exemplary embodiment of the zoom lens according to the present invention. FIGS. 13A and 13B are aberration diagrams at the wide angle end and at the telephoto end of the third exemplary embodiment of the zoom lens according to the present invention when the object distance is 2.24 m. FIGS. 14A and 14B are lateral chromatic aberration diagrams at the wide angle end and at the telephoto end of the third exemplary embodiment of the zoom lens according to the present invention when the object distance is 2.24 m.

Figure 17A:
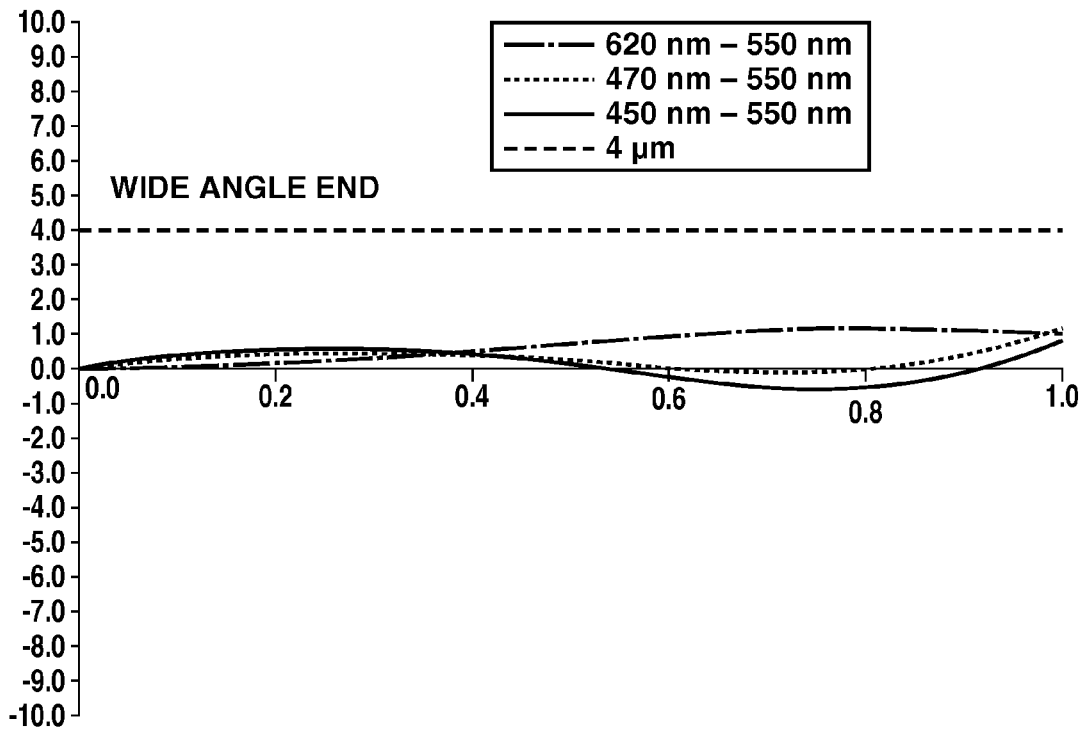
FIGS. 17A and 17B are lateral chromatic aberration diagrams at the wide angle end and at the telephoto end of the zoom lens according to the fourth exemplary embodiment when the object distance is 2.24 m.
Figure 17B:
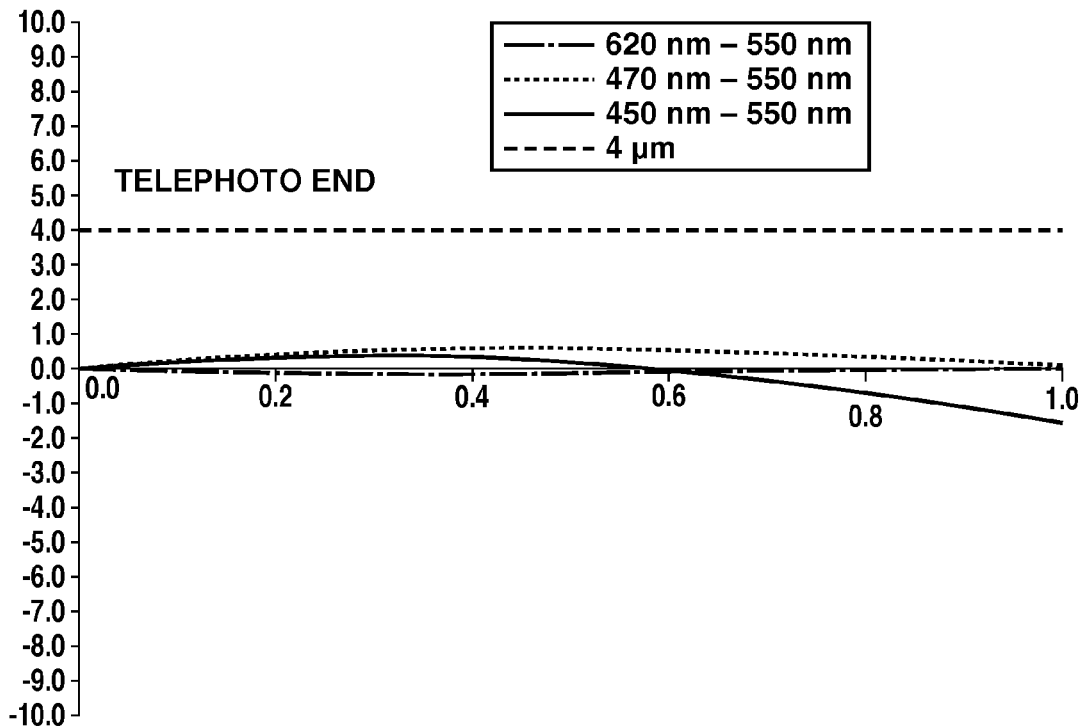

FIGS. 15A and 15B are lens cross-sectional views at the wide angle end and at the telephoto end of the fourth exemplary embodiment of the zoom lens according to the present invention. FIGS. 16A and 16B are aberration diagrams at the wide angle end and at the telephoto end of the fourth exemplary embodiment of the zoom lens according to the present invention when the object distance is 2.24 m. FIGS. 17A and 17B are lateral chromatic aberration diagrams at the wide angle end and at the telephoto end of the fourth exemplary embodiment of the zoom lens according to the present invention when the object distance is 2.24 m.

Figure 18:
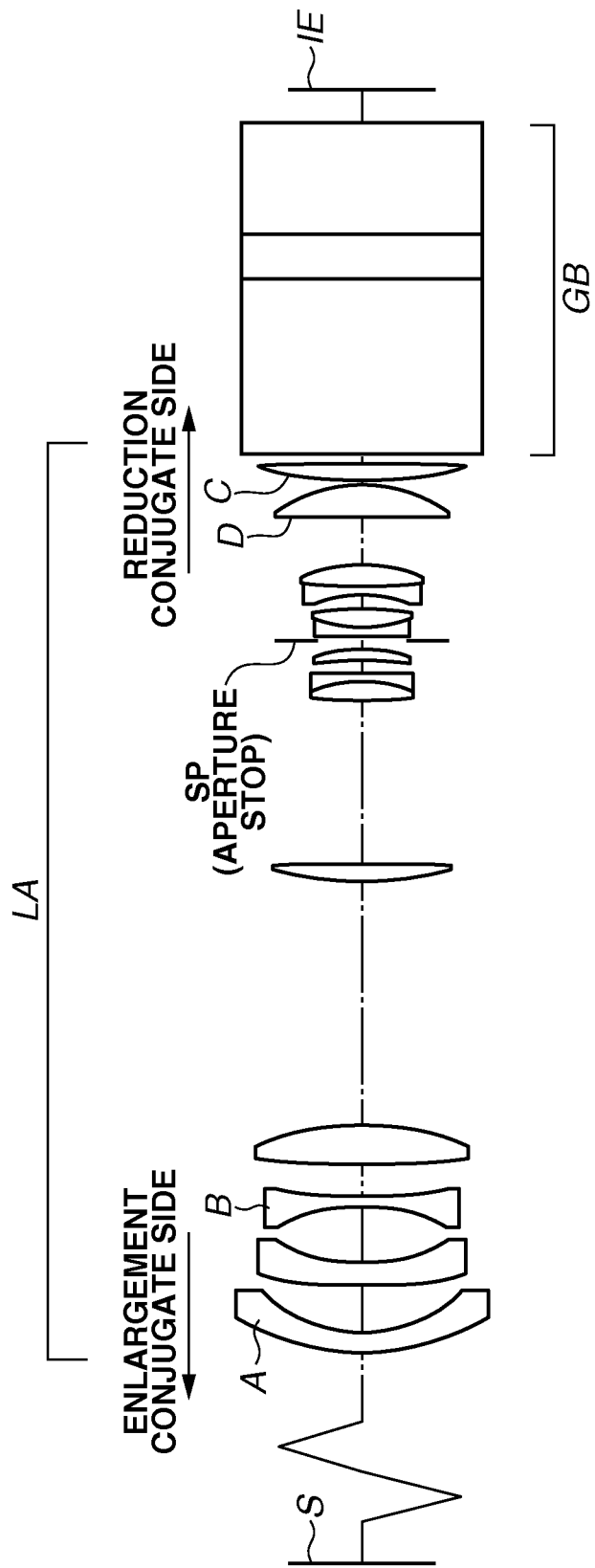
FIG. 18 is a lens cross-sectional view of a fifth exemplary embodiment of the present invention.
Figure 19:
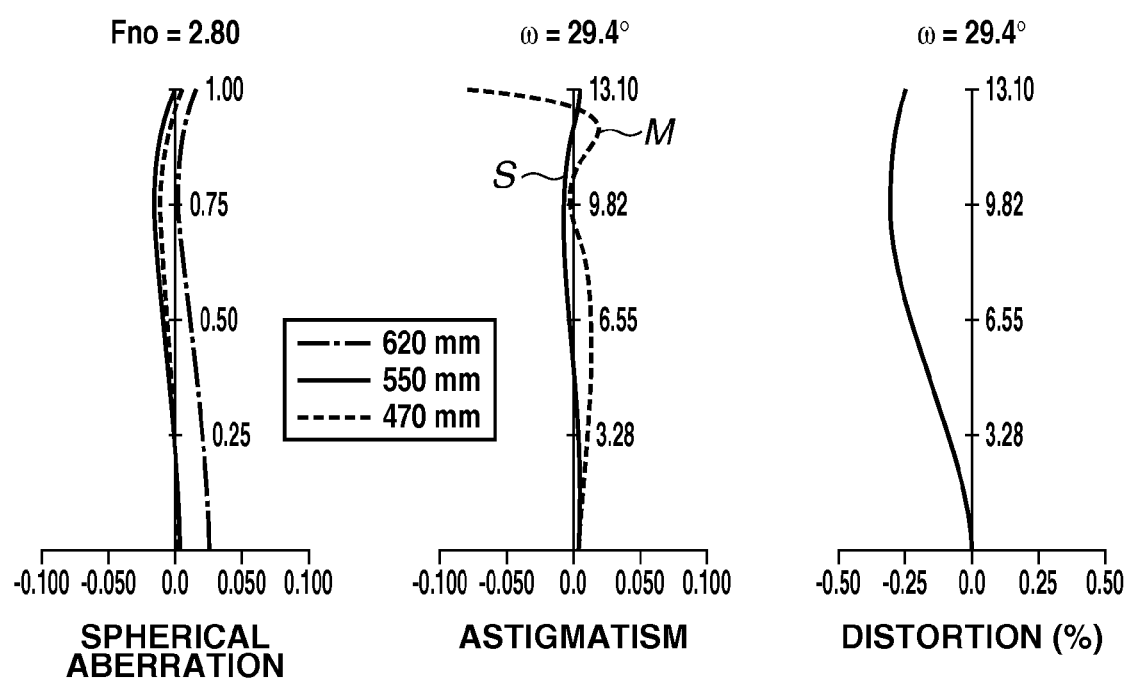
FIG. 19 is an aberration diagram of the fifth exemplary embodiment of the present invention.
Figure 20:
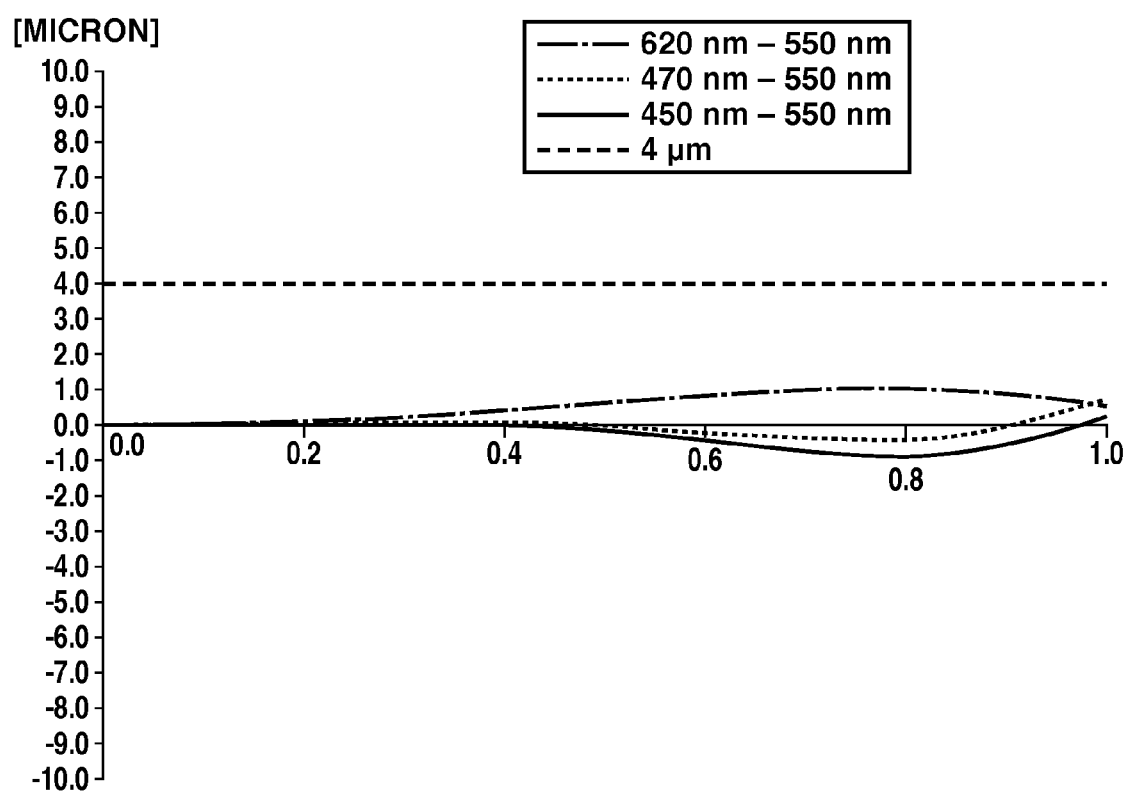
FIG. 20 is a lateral chromatic aberration diagram of the fifth exemplary embodiment of the present invention.
Figure 21:
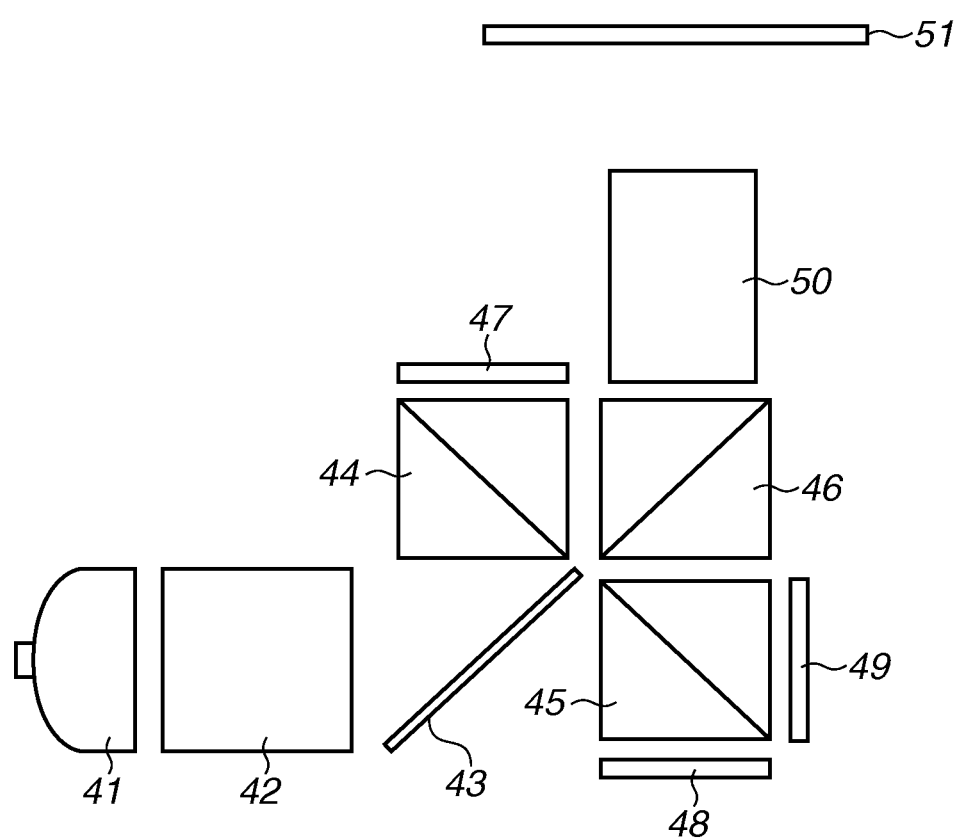
FIG. 21 is a schematic view of a main part of an image projection apparatus according to the present invention.

FIG. 18 is a lens cross-sectional view of the fifth exemplary embodiment of a projection optical system according to the present invention. FIG. 19 is an aberration diagram of the fifth exemplary embodiment of the projection optical system according to the present invention when the object distance is 2.24 m. FIG. 20 is a lateral chromatic aberration diagram of the fifth exemplary embodiment of the projection optical system according to the present invention when the object distance is 2.24 m. FIG. 21 is a schematic view of a main part of an image projection apparatus according to the present invention.

The projection optical system according to each exemplary embodiment is used for the image projection apparatus (projector). In each lens cross-sectional view, the left side is an enlargement conjugate side (screen) (front side) while the right side is a reduction conjugate side (image display element side) (rear side). LA is a projection optical system. When i represents an order of lens units counted from the enlargement conjugate side, Li is an i-th lens unit. SP is an aperture stop. IE corresponds to an original image (an image to be projected) such as a liquid crystal panel (image display element).

S is a screen surface. GB is an optical block corresponding to prisms for color separation and color combination, an optical filter, a face plate (parallel plate glass), a quartz low-pass filter, and an infrared cut filter. Arrows represent moving directions (moving loci) of the lens units at the time of zooming from the wide angle end to the telephoto end. The wide angle end and the telephoto end refer to zoom positions when the lens units for zooming are located at either end in a mechanically movable range on an optical axis.

In each aberration diagram, Fno is an F number, and A is a half viewing angle (degree). In each spherical aberration diagram, lights with wavelengths of 470 nm, 550 nm, and 620 nm are illustrated. In each astigmatism diagram, a dashed line M is a meridional image plane while a solid line S is a sagittal image plane. In each distortion aberration diagram, a light with a wavelength of 550 nm is illustrated.

The zoom lens according to each of the first to fourth exemplary embodiments includes a first lens unit L1 having negative refractive power that moves at the time of focusing (having a focusing function), a second lens unit L2 having positive refractive power, a third lens unit L3 having positive refractive power, a fourth lens unit L4 having negative refractive power, a fifth lens unit L5 having positive refractive power, and a sixth lens unit L6 having positive refractive power in this order from the enlargement conjugate side to the reduction conjugate side. At the time of zooming, the first and sixth lens units L1 and L6 do not move. At the time of zooming from the wide angle end to the telephoto end, the second to fifth lens units L2 to L5 move to the enlargement conjugate side.

The first and sixth lens units L1 and L6 are lens units that do not contribute to zooming while the second to fifth lens units L2 to L5 are zooming lens units. The aperture stop SP moves integrally with (in an equal locus to) the third lens unit L3 at the time of zooming.

Each exemplary embodiment is a projection optical system for use in an image projection apparatus having image display elements (in particular, a tricolor projector mounting liquid crystal display elements). The projection optical system according to each exemplary embodiment may be used as an image pickup optical system for an image pickup apparatus using image pickup elements instead of the image display elements. First, characteristics of the projection optical system LA according to the present invention when the projection optical system LA is a zoom lens will be described. When the projection optical system has a fixed focal length, the projection optical system can be regarded as a projection optical system corresponding to a zoom lens having a fixed focal length at the zoom position at the wide angle end.

In an approximately telecentric zoom lens for a liquid crystal projector, a first lens unit having negative refractive power which does not move at the time of zooming and moves at the time of focusing is arranged closest to the screen side (enlargement conjugate side) in many cases. A final lens unit having positive refractive power which does not move at the time of zooming is arranged closest to the panel side (reduction conjugate side). A plurality of lens units and an aperture stop which move at the time of zooming are provided between the first lens unit and the final lens unit.

The zoom lens according to the present invention has such a lens configuration, and in the zoom lens, a material for a negative lens located further on the enlargement conjugate side when viewed from the aperture stop and a material for a positive lens located further on the reduction conjugate side when viewed from the aperture stop are appropriately set to correct chromatic aberration caused by widening the viewing angle in a favorable manner.

Specifically, the zoom lens is configured in the following manner to reduce lateral chromatic aberration in the entire zoom range. A lang low dispersion anomalous dispersion material and a lang high dispersion anomalous dispersion material whose partial dispersion ratio θgF are larger than the normal line are used for a positive lens which is further located on the reduction conjugate side when viewed from the aperture stop SP and in which an incident height from an optical axis of an off-axis principal ray is high. At this time, correction of the lateral chromatic aberration only with the blue lowering effect due to the upward prism component is insufficient.

Under such circumstances, a lang low dispersion anomalous dispersion material and a lang high dispersion anomalous dispersion material whose partial dispersion ratio θgF are larger than the normal line are used for a negative lens which is further located on the enlargement conjugate side when viewed from the aperture stop SP and in which the incident height from the optical axis of the off-axis principal ray is high. By employing the similar configuration on the side further on the enlargement conjugate side when viewed from the aperture stop SP, an achromatic effect is obtained more.

In the projection optical system according to each exemplary embodiment, to enable the lenses located on the enlargement conjugate side and on the reduction conjugate side when viewed from the aperture stop SP to reduce the lateral chromatic aberration in the entire projection optical system, anomalous dispersion of materials for the target lenses and positions of the lenses in a direction of an optical axis are set appropriately. These are specifically described as follows.

The projection optical system according to the present invention is configured as follows when the projection optical system is a zoom lens (when the projection optical system has a zoom function). The projection optical system having the zoom function includes a plurality of positive lenses and a plurality of negative lenses. A negative lens arranged closest to the enlargement conjugate side is referred to as a negative lens A. A positive lens arranged closest to the reduction conjugate side is referred to as a positive lens C. At this time, the projection optical system includes an aperture stop between the negative lens A and the positive lens C. A distance from a vertex of a lens surface arranged closest to the enlargement conjugate side to a vertex of a lens surface arranged closest to the reduction conjugate side is referred to as a total optical length L.

A negative lens which is arranged at a position closest to the aperture stop, among negative lenses whose lens surfaces are arranged in a range up to a position separated in 0.22 L to the reduction conjugate side from the vertex of the lens surface arranged closest to the enlargement conjugate side both at the wide angle end and at the telephoto end is referred to as a negative lens B. A positive lens which is arranged at a position closest to the aperture stop, among positive lenses whose lens surfaces are arranged in a range up to a position separated in 0.29 L to the enlargement conjugate side from the vertex of the lens surface arranged closest to the reduction conjugate side both at the wide angle end and at the telephoto end is referred to as a positive lens D.

An Abbe number and anomalous dispersion of a material for the negative lens A are referred to as νdA and ΔθgFA, respectively. The Abbe number and the anomalous dispersion of a material for the negative lens B are referred to as vdB and $\Delta\theta gFB$, respectively. The Abbe number and the anomalous dispersion of a material for the positive lens C are referred to as vdC and $\Delta\theta gFC$, respectively. The Abbe number and the anomalous dispersion of a material for the positive lens D are referred to as vdD and $\Delta\theta gFD$, respectively.

At this time, the projection optical system satisfies the following conditional equations.

$$0.020 < \Delta\theta gFA < 0.040 \quad (1)$$

$$0.030 < \Delta\theta gFB < 0.055 \quad (2)$$

$$0.020 < \Delta\theta gFC < 0.040 \quad (3)$$

$$0.030 < \Delta\theta gFD < 0.055 \quad (4)$$

$$vdB - vdA > 55.0 \quad (5)$$

$$vdD - vdC > 55.0 \quad (6)$$

Also, the projection optical system according to the present invention is configured as follows when the projection optical system has a fixed focal length (when the projection optical system does not have a zoom function). The projection optical system includes a plurality of positive lenses and a plurality of negative lenses. A negative lens arranged closest to the enlargement conjugate side is referred to as a negative lens A. A positive lens arranged closest to the reduction conjugate side is referred to as a positive lens C. At this time, the projection optical system includes an aperture stop between the negative lens A and the positive lens C.

A distance from a vertex of a lens surface arranged closest to the enlargement conjugate side to a vertex of a lens surface arranged closest to the reduction conjugate side is referred to as a total optical length L. A negative lens which is arranged at a position closest to the aperture stop, among negative lenses whose lens surfaces are arranged in a range up to a position separated in 0.22 L to the reduction conjugate side from the vertex of the lens surface arranged closest to the enlargement conjugate side is referred to as a negative lens B. A positive lens which is arranged at a position closest to the aperture stop, among positive lenses whose lens surfaces are arranged in a range up to a position separated in 0.135 L to the enlargement conjugate side from the vertex of the lens surface arranged closest to the reduction conjugate side is referred to as a positive lens D.

An Abbe number and anomalous dispersion of a material for the negative lens A are referred to as vdA and $\Delta\theta FA$, respectively. The Abbe number and the anomalous dispersion of a material for the negative lens B are referred to as vdB and $\Delta\theta gFB$, respectively. The Abbe number and the anomalous dispersion of a material for the positive lens C are referred to as vdC and $\Delta\theta gFC$, respectively. The Abbe number and the anomalous dispersion of a material for the positive lens D are referred to as vdD and $\Delta\theta gFD$, respectively. At this time, the projection optical system satisfies the following conditional equations.

$$0.020 < \Delta\theta gFA < 0.040 \quad (1x)$$

$$0.030 < \Delta\theta gFB < 0.055 \quad (2x)$$

$$0.020 < \Delta\theta gFC < 0.040 \quad (3x)$$

$$0.030 < \Delta\theta gFD < 0.055 \quad (4x)$$

$$vdB - vdA > 55.0 \quad (5x)$$

$$vdD - vdC > 55.0 \quad (6x)$$

Note that the conditional equations (1) to (6) are ones when the projection optical system is a zoom lens, and the conditional equations (1x) to (6x) are ones when the projection optical system has a fixed focal length. The conditional equations (1) to (6) and the conditional equations (1x) to (6x) correspond to each other and have equal technical meanings to each other. Thus, in the following description, the conditional equations (1) and (1x) are each referred to as a conditional equation (1), the conditional equations (2) and (2x) are each referred to as a conditional equation (2), the conditional equations (3) and (3x) are each referred to as a conditional equation (3). Further, the conditional equations (4) and (4x) are each referred to as a conditional equation (4), the conditional equations (5) and (5x) are each referred to as a conditional equation (5), and the conditional equations (6) and (6x) are each referred to as a conditional equation (6).

Further, power values for positive lenses located on the enlargement conjugate side and negative lenses located on the reduction conjugate side when viewed from the aperture stop SP are referred to as $\Phi ai$ in order from the enlargement conjugate side. Power values for negative lenses located on the enlargement conjugate side and positive lenses located on the reduction conjugate side when viewed from the aperture stop SP are referred to as $\Phi bi$ in order from the enlargement conjugate side. Partial dispersion ratio values of materials for the positive lenses located on the enlargement conjugate side and the negative lenses located on the reduction conjugate side when viewed from the aperture stop SP are referred to as $\theta gFai$ in order from the enlargement conjugate side. Partial dispersion ratio values of materials for the negative lenses located r on the enlargement conjugate side and the positive lenses located on the reduction conjugate side when viewed from the aperture stop SP are referred to as $\theta gFbi$ in order from the enlargement conjugate side.

An average value of the partial dispersion ratio values $\theta gFai$ is referred to as $\theta gFa$. An average value of the partial dispersion ratio values $\theta gFbi$ is referred to as $\theta gFb$. At this time, in the case in which the projection optical system is either a zoom lens or a projection optical system having a fixed focal length, it is desirable that the projection optical system further satisfies the following conditional equations.

$$0 < \Sigma|\Phi ai \times \theta gFai|/\Sigma|\Phi ai| - \Sigma|\Phi bi \times \theta gFbi|/\Sigma|\Phi bi| < 0.019 \quad (7)$$

$$-0.010 < (\theta gFa) - (\theta gFb) < 0.010 \quad (8)$$

Here, a refractive index for a d line (wavelength: 587.6 nm) of a material is referred to as Nd, a refractive index for an F line (wavelength: 486.1 nm) of a material is referred to as NF, a refractive index for a g line (wavelength: 435.8 nm) of a material is referred to as Ng, and a refractive index for a C line (wavelength: 656.3 nm) of a material is referred to as Nc.

At this time, the Abbe number vd, the partial dispersion ratio $\theta gF$, and the anomalous dispersion $\Delta vgF$ are as follows.

$$vd = (Nd-1)/(NF-NC)$$

$$\theta gF = (Ng-NF)/(NF-NC)$$

$$\Delta\theta gF = \theta gF - (0.6438 - 0.001682\ vd)$$

Next, the technical meaning of each of the aforementioned conditional equations will be described. Here, the conditional equation (1) is one limiting the anomalous dispersion of a material for the negative lens A arranged closest to the enlargement conjugate side. When the anomalous dispersion is less than a lower limit value of the conditional equation (1), the achromatic effect in the negative lens A is weakened, and the achromatic effect in the negative lenses located on the enlargement conjugate side when viewed from the aperture stop SP and the positive lenses located on the reduction conjugate side when viewed from the aperture stop SP is weakened.

The achromatic effect in the positive lenses located on the enlargement conjugate side when viewed from the aperture stop SP and the negative lenses located on the reduction conjugate side when viewed from the aperture stop SP is relatively strengthened, the achromatic balance in the entire optical system is lost, and the blue lateral chromatic aberration in particular remains. When the anomalous dispersion is more than an upper limit value of the conditional equation (1), the achromatic effect in the negative lens A is excessively strengthened, and the achromatic effect in the negative lenses located on the enlargement conjugate side when viewed from the aperture stop SP and the positive lenses located on the reduction conjugate side when viewed from the aperture stop SP is strengthened.

The achromatic effect in the positive lenses located on the enlargement conjugate side when viewed from the aperture stop SP and the negative lenses located on the reduction conjugate side when viewed from the aperture stop SP is relatively weakened, the achromatic balance in the entire optical system is lost, and the blue lateral chromatic aberration in particular remains. In either case in which the anomalous dispersion deviates from the upper limit value or the lower limit value of the conditional equation (1), it is difficult to satisfy reduction of the lateral chromatic aberration.

The conditional equation (2) is one limiting the anomalous dispersion of a material for the negative lens B arranged closest to the aperture stop SP. When the anomalous dispersion is less than a lower limit value of the conditional equation (2), the achromatic effect in the negative lens B is weakened, and the achromatic effect in the negative lenses located on the enlargement conjugate side when viewed from the aperture stop SP and the positive lenses located on the reduction conjugate side when viewed from the aperture stop SP is weakened. The achromatic effect in the positive lenses located on the enlargement conjugate side when viewed from the aperture stop SP and the negative lenses located on the reduction conjugate side when viewed from the aperture stop SP is relatively strengthened, the achromatic balance in the entire optical system is lost, and the blue lateral chromatic aberration in particular remains.

When the anomalous dispersion is more than an upper limit value of the conditional equation (2), the achromatic effect in the negative lens B is excessively strengthened, and the achromatic effect in the negative lenses located on the enlargement conjugate side when viewed from the aperture stop SP and the positive lenses located on the reduction conjugate side when viewed from the aperture stop SP is strengthened. The achromatic effect in the positive lenses located on the enlargement conjugate side than the aperture stop SP and the negative lenses located on the reduction conjugate side when viewed from the aperture stop SP is relatively weakened, the achromatic balance in the entire optical system is lost, and the blue lateral chromatic aberration in particular remains. In either case in which the anomalous dispersion deviates from the upper limit value or the lower limit value of the conditional equation (2), it is difficult to satisfy reduction of the lateral chromatic aberration.

The conditional equation (3) is one limiting the anomalous dispersion of a material for the positive lens C arranged closest to the reduction conjugate side. When the anomalous dispersion is less than a lower limit value of the conditional equation (3), the achromatic effect in the positive lens C is weakened, and the achromatic effect in the negative lenses located on the enlargement conjugate side when viewed from the aperture stop SP and the positive lenses located on the reduction conjugate side when viewed from the aperture stop SP is weakened. The achromatic effect in the positive lenses located on the enlargement conjugate side when viewed from the aperture stop SP and the negative lenses located on the reduction conjugate side when viewed from the aperture stop SP is relatively strengthened, the achromatic balance in the entire optical system is lost, and the blue lateral chromatic aberration in particular remains.

When the anomalous dispersion is more than an upper limit value of the conditional equation (3), the achromatic effect in the positive lens C is excessively strengthened, and the achromatic effect in the negative lenses located r on the enlargement conjugate side when viewed from the aperture stop SP and the positive lenses located on the reduction conjugate side when viewed from the aperture stop SP is strengthened. The achromatic effect in the positive lenses located on the enlargement conjugate side when viewed from the aperture stop SP and the negative lenses located on the reduction conjugate side when viewed from the aperture stop SP is relatively weakened, the achromatic balance in the entire optical system is lost, and the blue lateral chromatic aberration in particular remains. In either case in which the anomalous dispersion deviates from the upper limit value or the lower limit value of the conditional equation (3), it is difficult to satisfy reduction of the lateral chromatic aberration.

The conditional equation (4) is one limiting the anomalous dispersion of a material for the positive lens D. When the anomalous dispersion is less than a lower limit value of the conditional equation (4), the achromatic effect in the positive lens D is weakened, and the achromatic effect in the negative lenses located on the enlargement conjugate side when viewed from the aperture stop SP and the positive lenses located on the reduction conjugate side when viewed from the aperture stop SP is weakened. The achromatic effect in the positive lenses located on the enlargement conjugate side when viewed from the aperture stop SP and the negative lenses located on the reduction conjugate side when viewed from the aperture stop SP is relatively strengthened, the achromatic balance in the entire optical system is lost, and the blue lateral chromatic aberration in particular remains.

When the anomalous dispersion is more than an upper limit value of the conditional equation (4), the achromatic effect in the positive lens D is excessively strengthened, and the achromatic effect in the negative lenses located on the enlargement conjugate side when viewed from the aperture stop SP and the positive lenses located on the reduction conjugate side when viewed from the aperture stop SP is strengthened. The achromatic effect in the positive lenses located on the enlargement conjugate side when viewed from the aperture stop SP and the negative lenses located on the reduction conjugate side when viewed from the aperture stop SP is relatively weakened, the achromatic balance in the entire optical system is lost, and the blue lateral chromatic aberration in particular remains. In either case in which the anomalous dispersion deviates from the upper limit value or the lower limit value of the conditional equation (4), it is difficult to satisfy reduction of the lateral chromatic aberration.

The conditional equation (5) is one limiting the difference of the Abbe numbers of the material for the negative lens B and the material for the negative lens A. When the difference is less than a lower limit value of the conditional equation (5), it is difficult to find the combination of materials which keeps the average value of the Abbe numbers of the materials for the negative lens B and the negative lens A reasonably large for the achromatism and which satisfies the anomalous dispersion in the aforementioned conditional equations (1) and (2).

The conditional equation (6) is one limiting the difference of the Abbe numbers of the material for the positive lens D and the material for the positive lens C. When the difference is less than a lower limit value of the conditional equation (6), it is difficult to find the combination of materials which keeps the average value of the Abbe numbers of the materials for the positive lens D and the positive lens C reasonably large for the achromatism in a similar manner to the case of the negative lens B and the negative lens A and which satisfies the anomalous dispersion in the aforementioned conditional equations (3) and (4).

The conditional equation (7) relates to the partial dispersion ratio values of the positive lenses located on the enlargement conjugate side when viewed from the aperture stop SP and the negative lenses located on the reduction conjugate side when viewed from the aperture stop SP in the projection optical system and the power values for the respective lenses. The conditional equation (7) also relates to the partial dispersion ratio values of the negative lenses located on the enlargement conjugate side when viewed from the aperture stop SP and the positive lenses located on the reduction conjugate side when viewed from the aperture stop SP and the power values for the respective lenses.

When the value is less than a lower limit value of the conditional equation (7), the achromatic effect in the negative lenses located on the enlargement conjugate side when viewed from the aperture stop SP and the positive lenses located on the reduction conjugate side when viewed from the aperture stop SP becomes excessive as seen in the entire optical system, and the blue lateral chromatic aberration in particular remains significantly. When the value is more than an upper limit value of the conditional equation (7), the achromatic effect in the positive lenses located on the enlargement conjugate side when viewed from the aperture stop SP and the negative lenses located on the reduction conjugate side when viewed from the aperture stop SP becomes excessive as seen in the entire optical system, and the blue lateral chromatic aberration in particular is generated excessively in a reverse direction of a direction in the case of the lower limit value.

The conditional equation (8) relates to the average value of the partial dispersion ratio values of the positive lenses located on the enlargement conjugate side when viewed from the aperture stop SP and the negative lenses located on the reduction conjugate side when viewed from the aperture stop SP in the projection optical system. The conditional equation (8) also relates to the average value of the partial dispersion ratio values of the negative lenses located on the enlargement conjugate side when viewed from the aperture stop SP and the positive lenses located on the reduction conjugate side when viewed from the aperture stop SP. When the value is less than a lower limit value of the conditional equation (8), the achromatic effect in the positive lenses located on the enlargement conjugate side when viewed from the aperture stop SP and the negative lenses located on the reduction conjugate side when viewed from the aperture stop SP is strengthened as seen in the entire optical system, and the blue lateral chromatic aberration in particular remains significantly.

When the value is more than an upper limit value of the conditional equation (8), the achromatic effect in the negative lenses located on the enlargement conjugate side when viewed from the aperture stop SP and the positive lenses located on the reduction conjugate side when viewed from the aperture stop SP becomes excessive as seen in the entire optical system, and the blue lateral chromatic aberration in particular is generated in a reverse direction of a direction in the case of the lower limit value.

Since the projection optical system is configured to satisfy the conditional equations (1) to (8), the projection optical system can reduce lateral chromatic aberration in the entire zoom range when the projection optical system is used as a zoom lens and can obtain characteristics enabling the projection optical system to be applied in a liquid crystal projector. Also, in each exemplary embodiment, an effective diameter of a negative lens located on the reduction conjugate side when viewed from the aperture stop SP is considered in addition to the aforementioned conditional equations (1) to (8). The reason for this is that, with use of relation between the effective diameter and an incident height, in which the incident height of an off-axis principal ray changes with the effective diameter, the incident height of the off-axis principal ray passing through the negative lens is suppressed to reduce the generation amount of high-order lateral chromatic aberration in the negative lens.

Specifically, an effective diameter of a negative lens located on the reduction conjugate side when viewed from the aperture stop SP and located closest to the reduction conjugate side is referred to as $\Phi sn$. An effective diameter of a positive lens located on the reduction conjugate side when viewed from the aperture stop SP and located closest to the reduction conjugate side is referred to as $\Phi sp$. At this time, the following conditional equation is satisfied.

$$0.40 < \Phi sn/\Phi sp < 0.50 \tag{9}$$

When the value is less than a lower limit value of the conditional equation (9), the effective diameter of the negative lens located on the reduction conjugate side when viewed from the aperture stop SP and the incident height of the off-axis principal ray decrease excessively, and the lateral chromatic aberration generated in the lens is reduced excessively. Conversely, since the effective diameter of the positive lens located on the reduction conjugate side when viewed from the aperture stop SP increases relatively, the generation amount of the lateral chromatic aberration in the positive lens located closest to the reduction conjugate side increases relatively. The amount becomes excessive, the achromatic effect in the positive lens located closest to the reduction conjugate side is generated excessively, the achromatic balance in the entire optical system is lost, and the blue lateral chromatic aberration in particular is generated significantly.

When the value is more than an upper limit value of the conditional equation (9), the effective diameter of the negative lens located on the reduction conjugate side when viewed from the aperture stop SP and the incident height of the off-axis principal ray increase excessively, and the lateral chromatic aberration generated in the lens increases excessively. The effective diameter of the positive lens located closest to the reduction conjugate side when viewed from the aperture stop SP then decreases relatively. Thus, the generation amount of the lateral chromatic aberration in the positive lens located closest to the reduction conjugate side decreases relatively, and the achromatic effect in the negative lens located on the reduction conjugate side when viewed from the aperture stop SP is generated excessively. Consequently, the achromatic balance in the entire optical system is lost, and the blue lateral chromatic aberration in particular is generated significantly.

Since the projection optical system is configured to satisfy the conditional equations (1) to (9) in each of the exemplary embodiments, the projection optical system can reduce lateral chromatic aberration in the entire zoom range when the projection optical system is used as a zoom lens and can obtain optical characteristics enabling the projection optical system to be applied in the liquid crystal projector.

Further, it is desirable that the numerical ranges of the conditional equations (1) to (9) are set in the following manner.

$$0.022 < \Delta\theta gFA < 0.039 \quad (1a)$$

$$0.030 < \Delta\theta gFB < 0.052 \quad (2a)$$

$$0.022 < \Delta\theta gFC < 0.039 \quad (3a)$$

$$0.030 < \Delta\theta gFD < 0.052 \quad (4a)$$

$$90.0 > vdB - vdA > 56.5 \quad (5a)$$

$$90.0 > vdD - vdC > 56.5 \quad (6a)$$

$$0.001 < \Sigma|\Phi ai \times \theta gFai|/\Sigma|\Phi ai| - \Sigma|\Phi bi \times \theta gFbi|/\Sigma|\Phi bi| < 0.019 \quad (7a)$$

$$-0.006 < (\theta gFa) - (\theta gFb) < 0.008 \quad (8a)$$

$$0.410 < \Phi sn/\Phi sp < 0.480 \quad (9a)$$

As described above, according to the respective exemplary embodiments, since the projection optical system is configured to satisfy the aforementioned conditions, the projection optical system reducing the lateral chromatic aberration can be obtained. Accordingly, the lateral chromatic aberration is corrected more favorably than in a conventional example, and favorable image forming performance and telecentricity are achieved. The projection optical system for the liquid crystal projector applicable to higher resolution represented by 4K resolution can be obtained.

Hereinbelow, the zoom lens according to the first exemplary embodiment of the present invention will be described using FIGS. 1A and 1B. FIGS. 1A and 1B are lens cross-sectional views at the wide angle end and at the telephoto end of the first exemplary embodiment of the present invention. The first exemplary embodiment includes the first to sixth lens units L1 to L6 having negative, positive, positive, negative, positive, and positive refractive power in this order from the enlargement conjugate side to the reduction conjugate side. At the time of zooming, the first and sixth lens units L1 and L6 do not move. At the time of zooming from the wide angle end to the telephoto end, the second to fifth lens units L2 to L5 move to the enlargement conjugate side in the arrow directions.

Hereinbelow, optical characteristics of the zoom lens according to the present exemplary embodiment will be described. In a negative-lead type zoom lens, the blue lateral chromatic aberration tends to increase to the over direction in the entire zoom range. For this reason, application of the zoom lens in a projector requiring high resolution represented by 4K resolution in which a size of each pixel is further reduced is not necessarily sufficient.

FIG. 5 is a schematic view of an optical path in paraxial refractive power arrangement of a negative-lead type zoom lens. FIG. 5 is a schematic view when an off-axis principal ray passes through the lenses to pass through the center of the aperture stop SP from the lower left to the upper right of the drawing sheet.

Conventionally, in the negative-lead type zoom lens, high dispersion glass whose anomalous dispersion is lang is used for the positive lens GP1 located on the enlargement conjugate side when viewed from the aperture stop SP and the negative lens GN2 located on the reduction conjugate side when viewed from the aperture stop SP that are located near the aperture stop SP. Also, in the negative lens GN1 located further when viewed from the aperture stop SP and located on the enlargement conjugate side, lang high dispersion anomalous dispersion glass and low dispersion anomalous dispersion glass whose partial dispersion ratio θgF is located on the upper side than the normal line are arranged in this order from the enlargement conjugate side to the reduction conjugate side.

In the positive lens GP2 located on the reduction conjugate side, lang high dispersion anomalous dispersion glass and low dispersion anomalous dispersion glass whose partial dispersion ratio θgF is located on the upper side than the normal line are generally arranged in this order from the reduction conjugate side. At this time, the blue raising effect due to the downward prism component is generated strongly since the high dispersion glass whose anomalous dispersion is lang is used. This causes the blue raising to remain significantly as seen in the entire optical system.

As illustrated in FIG. 7, a negative lens GN3 is newly arranged at a position which is further located on the enlargement conjugate side when viewed from the aperture stop SP and in which the incident height from the optical axis of the off-axis principal ray is high. In addition, a positive lens GP3 is newly arranged at a position which is further located on the reduction conjugate side when viewed from the aperture stop SP and in which the incident height from the optical axis of the off-axis principal ray is high. High dispersion anomalous dispersion glass whose anomalous dispersion is lang is used for the negative lens GN3 and the positive lens GP3. Further, high dispersion glass whose anomalous dispersion is located slightly on a kurz side is used for the positive lens GP1 and the negative lens GN2 around the aperture stop SP corresponding to the downward prism component.

Optimal arrangement is employed so that a difference between a power average for the partial dispersion ratio θgF of materials for lenses corresponding to the upward prism component and a power average for the partial dispersion ratio θgF of materials for lenses corresponding to the downward prism component in the entire system may be small. The blue raising effect due to the downward prism component is weakened further than in the conventional negative-lead type zoom lens, and the blue lowering effect due to the upward prism component is strengthened relatively. Accordingly, a cancelling effect between the upward prism component and the downward prism component can be secured more than in the conventional case, and the lateral chromatic aberration in the entire optical system is favorably corrected.

The second exemplary embodiment is an embodiment in which a low dispersion anomalous dispersion material whose partial dispersion ratio θgF is located on the upper side than the normal line is used for the positive lens located on the reduction conjugate side when viewed from the aperture stop SP, and in which with respect to the conditional equations, a material for the positive lens D is changed, in comparison with the first exemplary embodiment. In the second exemplary embodiment, the effects of the upward prism and the downward prism in the entire lens system are approximately equal to those in the first exemplary embodiment even when the material for the positive lens is changed to one whose anomalous dispersion is weaker than that in the first exemplary embodiment. Accordingly, the lateral chromatic aberration is reduced in the entire zoom range in a similar manner to that in the first exemplary embodiment.

Accordingly, a zoom lens having a lens configuration different from that in the first exemplary embodiment, favorably correcting the lateral chromatic aberration in the entire zoom range, and easily applied in the liquid crystal projector is obtained. The other lens configuration and optical functions are equal to those in the first exemplary embodiment.

The third exemplary embodiment is configured to have a lower F number for obtaining a brighter image than in the first and second exemplary embodiments. To favorably secure the lower F number and correct various kinds of aberration, three lenses to be used are added in comparison to the first and second exemplary embodiments. Another difference is that the conditional equation (9) regarding the effective diameter is excluded.

Since the lens configuration in the third exemplary embodiment, is approximately similar to those in the first and second exemplary embodiments, a zoom lens reducing the lateral chromatic aberration in the entire zoom range and easily applied in the liquid crystal projector is obtained even with the lower F number. The other lens configuration and optical functions are equal to those in the first exemplary embodiment.

In the fourth exemplary embodiment, materials used for lenses corresponding to the conditional equations (1) to (4) are changed, and a lower F number for obtaining a brighter image than in the first and second exemplary embodiments is obtained. To secure the lower F number and favorably correct various kinds of aberration, four lenses to be used are added in comparison to the first and second exemplary embodiments. Another difference is that the conditional equation (9) regarding the effective diameter is excluded.

Since in the fourth exemplary embodiment, the lens configuration is approximately similar to those in the first and second exemplary embodiments, the lateral chromatic aberration is reduced in the entire zoom range even with different materials used for lenses corresponding to the conditional equations (1) to (4) from those in the first and second exemplary embodiments and even with the lower F number. The zoom lens easily applied in the liquid crystal projector is obtained. The other lens configuration and optical functions are equal to those in the first exemplary embodiment.

The projection optical system according to the fifth exemplary embodiment is an optical system having a fixed focal length. Even in the present exemplary embodiment having a different lens type, since the projection optical system is configured to have a lens configuration satisfying the conditional equations (1) to (9), the projection optical system in which the lateral chromatic aberration is reduced and in which application in the liquid crystal projector is easy is obtained. The other lens configuration and optical functions are equal to those in the four aforementioned exemplary embodiments.

The image projection apparatus in FIG. 21 will be described. In FIG. 21, a light source 41 is provided. An illumination optical system 42 achieves illumination to image display elements with less unevenness and has a function of orienting a polarization direction of an emitted light to an arbitrary direction of a P-polarized light or an S-polarized light. A color separation optical system 43 separates a light from the illumination optical system 42 into arbitrary colors corresponding to the image display elements.

Image display elements 47, 48, and 49 modulate an incident polarized light according to an electric signal and forms an image consisting of reflective liquid crystal. Polarization beam splitters 44 and 45 transmit or reflect a light according to the modulation in the image display elements 47, 48, and 49. A color combining optical system 46 combines lights from the respective image display elements 47, 48, and 49 into one. A projection optical system 50 projects a light combined in the color combining optical system 46 on a surface to be projected such as a screen 51. By using the projection optical system according to each of the aforementioned exemplary embodiments as the projection optical system 50, the image projection apparatus in which changes of various kinds of aberration are favorably corrected, and in which optical performance is favorable over the entire image, is obtained.

The exemplary embodiments according to the present invention have been described above. The present invention is not limited to these exemplary embodiments and can be varied or modified in various forms within the scope thereof. For example, the projection optical system according to each of the first to fourth exemplary embodiments has a six-unit configuration and the projection optical system according to the fifth exemplary embodiment has a fixed focal length. However, the projection optical system according to each of the first to fourth exemplary embodiments may be a zoom lens having a seven-unit or eight-unit configuration by separating one moving lens unit into two and moving the two units along different loci from those of each other.

Next, numerical examples for the projection optical systems according to the respective exemplary embodiments are provided. Surface numbers in the lens configuration of each numerical example are numbers provided to respective lens surfaces in order from the enlargement conjugate side to the reduction conjugate side. In each numerical example, r represents a curvature radius of each lens surface, and d represents a distance (physical distance) on the optical axis between a lens surface i and a lens surface (i+1). OBJ is a screen (projection position). A d value regarding the OBJ is a projection distance.

A distance provided with "variable" in the tables varies along zooming. Also, nd and vd represent a refractive index for a d line of a material for each lens and an Abbe number, respectively. Also, in each of Numerical Examples 1 to 4, a focal length, an aperture ratio (F number), a half viewing angle, an image height, a total optical length, a back focus in air (BF), a zoom ratio, and a distance between lens units at the time of zooming are provided. The back focus represents a distance from a final lens surface to a surface to be projected. A surface provided on the side of the surface number thereof with "*" is aspheric, and aspheric surface coefficients A to G representing an aspheric surface shape thereof are provided in various data.

Assume that the optical axis direction is an X axis, a direction perpendicular to the optical axis is a y axis, and a light traveling direction is positive. In this case, when R represents a paraxial curvature radius, K represents a conic constant, A, B, C . . . represent aspheric surface coefficients, and E–X is $10^{-x}$, an aspheric surface shape is expressed as follows.

$$x=(y^2/R)/[1+\{1-(1+K)(y^2/R^2)\}^{1/2}]+Ay^4+By^6+Cy^8+Dy^{10}+Ey^{12}$$

Also, relationship between the aforementioned respective exemplary embodiments and values is illustrated in (Table 1; see FIG. 27 for Table 1).

Information related to Numerical Example 1 is illustrated in FIG. 22.

| Various data | | | |
|---|---|---|---|
| Zoom ratio | 1.50159 | | |
| Focal length | 23.3058 | 29.5983 | 34.9956 |
| F number | 2.8000 | 3.1964 | 3.5939 |
| Half viewing angle (degree) | 29.3586 | 23.8900 | 20.5368 |
| Image height | 13.1100 | 13.1100 | 13.1100 |
| Total optical length | 155.000 | 155.000 | 155.000 |
| BF (in air) | 44.3400 | 44.3400 | 44.3400 |
| d0 | 2240.00 | 2800.00 | 3360.00 |
| d8 | 40.9754 | 22.5438 | 10.5310 |
| d10 | 29.8818 | 32.6391 | 33.0373 |
| d16 | 1.00000 | 3.17150 | 6.80830 |
| d19 | 2.67620 | 2.99730 | 2.19600 |
| d24 | 1.00000 | 14.1816 | 22.9608 |

| Aspheric surface coefficients | | | | | | |
|---|---|---|---|---|---|---|
| | K | A | B | C | D | E |
| s3 | 0 | 2.7947E−05 | −7.4993E−08 | 1.8152E−10 | −2.7016E−13 | 1.8174E−16 |
| s4 | 0 | 2.5494E−05 | −7.6800E−08 | 1.5187E−10 | −1.8837E−13 | 3.7431E−17 |

Information related to Numerical Example 2 is illustrated in FIG. 23.

| Various data | | | |
|---|---|---|---|
| Zoom ratio | 1.50726 | | |
| Focal length | 23.1415 | 28.8238 | 34.8802 |
| F number | 2.8000 | 3.2072 | 3.6043 |
| Half viewing angle (degree) | 29.5322 | 24.4576 | 20.5991 |
| Image height | 13.1100 | 13.1100 | 13.1100 |
| Total optical length | 155.000 | 155.000 | 155.000 |
| BF (in air) | 39.6400 | 39.6400 | 39.6400 |
| d0 | 2240.00 | 2800.00 | 3360.00 |
| d8 | 28.1784 | 12.5454 | 1.00000 |
| d10 | 21.4882 | 21.6092 | 23.3663 |
| d16 | 2.12670 | 5.97610 | 9.46340 |
| d19 | 9.95830 | 9.68140 | 1.62570 |
| d24 | 7.91550 | 19.8551 | 34.2117 |

| Aspheric surface coefficients | | | | | | |
|---|---|---|---|---|---|---|
| | K | A | B | C | D | E |
| s3 | 0 | 2.8042E−05 | −8.1974E−08 | 1.8575E−10 | −2.4979E−13 | 1.6263E−16 |
| s4 | 0 | 2.4241E−05 | −9.1328E−08 | 1.6645E−10 | −1.8662E−13 | 8.0052E−17 |

Information related to Numerical Example 3 is illustrated in FIG. 24.

| Various data | | | |
|---|---|---|---|
| Zoom ratio | 1.50123 | | |
| Focal length | 23.2808 | 29.4546 | 34.9498 |
| F number | 2.4073 | 2.8625 | 3.3602 |
| Half viewing angle (degree) | 29.3949 | 23.9934 | 20.5615 |
| Image height | 13.1100 | 13.1100 | 13.1100 |
| Total optical length | 155.000 | 155.000 | 155.000 |
| BF (in air) | 42.9000 | 42.9000 | 42.9000 |
| d0 | 2240.00 | 2800.00 | 3360.00 |
| d11 | 41.5865 | 24.4824 | 13.5986 |
| d13 | 26.6251 | 24.6837 | 18.0033 |
| d19 | 1.29900 | 9.59840 | 21.3536 |
| d24 | 1.96620 | 0.79760 | 1.57930 |
| d29 | 1.00000 | 12.9146 | 17.9419 |

-continued

| Aspheric surface coefficients | | | | | | |
|---|---|---|---|---|---|---|
| | K | A | B | C | D | E |
| s3 | 0 | 3.9570E−05 | −7.1696E−08 | 1.5172E−10 | −1.6844E−13 | 1.6385E−18 |
| s4 | 0 | 3.8063E−05 | −7.2960E−08 | 1.3113E−10 | −1.6490E−13 | −1.5101E−16 |

Information related to Numerical Example 4 is illustrated in FIG. 25.

| Various data | | | |
|---|---|---|---|
| Zoom ratio | 1.49983 | | |
| Focal length | 23.3438 | 29.6411 | 35.0117 |
| F number | 2.6069 | 2.8634 | 3.1863 |
| Half viewing angle (degree) | 29.3188 | 23.8594 | 20.5282 |
| Image height | 13.1100 | 13.1100 | 13.1100 |
| Total optical length | 155.000 | 155.000 | 155.000 |
| BF (in air) | 41.2600 | 41.2600 | 41.2600 |
| d0 | 2240.00 | 2800.00 | 3360.00 |
| d11 | 41.5396 | 23.1157 | 11.6042 |
| d14 | 1.25000 | 7.51730 | 3.46880 |
| d20 | 6.71990 | 6.55020 | 11.8435 |
| d25 | 1.97120 | 3.17840 | 2.75000 |
| d30 | 2.78880 | 13.9079 | 24.6030 |

| Aspheric surface coefficients | | | | | | |
|---|---|---|---|---|---|---|
| | K | A | B | C | D | E |
| s3 | 0 | 3.8165E−05 | −6.8170E−08 | 1.2451E−10 | −1.2298E−13 | 4.9728E−17 |
| s4 | 0 | 4.2178E−05 | −5.7784E−08 | 8.4626E−10 | 2.1955E−14 | −1.2853E−16 |

Information related to Numerical Example 5 is illustrated in FIG. 26.

| Various data | |
|---|---|
| Zoom ratio | 1.50159 |
| Focal length | 23.3058 |
| F number | 2.8000 |
| Half viewing angle (degree) | 29.3586 |
| Image height | 13.1100 |
| Total optical length | 155.000 |
| BF (in air) | 44.3400 |

| Aspheric surface coefficients | | | | | | |
|---|---|---|---|---|---|---|
| | K | A | B | C | D | E |
| s3 | 0 | 2.7947E−05 | −7.4993E−08 | 1.8152E−10 | −2.7016E−13 | 1.8174E−16 |
| s4 | 0 | 2.5494E−05 | −7.6800E−08 | 1.5187E−10 | −1.8837E−13 | 3.7431E−17 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-159211, filed Aug. 5, 2014, which is hereby incorporated by reference herein in its entirety.

What is claimed is:

1. A projection optical system having a zooming function comprising:
   a plurality of positive lenses and a plurality of negative lenses; and
   an aperture stop arranged between a negative lens A arranged closest to an enlargement conjugate side out of the plurality of negative lenses and a positive lens C arranged closest to a reduction conjugate side out of the plurality of positive lenses,
   wherein,
   when a negative lens arranged at a position closest to the aperture stop, among negative lenses whose lens surfaces are arranged in a range up to a position separated in 0.22 L to the reduction conjugate side from a vertex of a lens surface arranged closest to the enlargement conjugate side both at a wide angle end and at a telephoto end is referred to as a negative lens B when a distance from the vertex of the lens surface arranged closest to the enlargement conjugate side to a vertex of a lens surface arranged closest to the reduction conjugate side is referred to as a total optical length L,
when a positive lens arranged at a position closest to the aperture stop, among positive lenses whose lens surfaces are arranged in a range up to a position separated in 0.29 L to the enlargement conjugate side from the vertex of the lens surface arranged closest to the reduction conjugate side both at the wide angle end and at the telephoto end is referred to as a positive lens D,
when a refractive index for a d line (wavelength: 587.6 nm) of a material is referred to as Nd,
when a refractive index for an F line (wavelength: 486.1 nm) of a material is referred to as NF,
when a refractive index for a g line (wavelength: 435.8 nm) of a material is referred to as Ng,
when a refractive index for a C line (wavelength: 656.3 nm) of a material is referred to as Nc,
when an Abbe number νd, a partial dispersion ratio θgF, and anomalous dispersion ΔθgF are defined as $$\nu d=(Nd-1)/(NF-NC)$$

$$\theta gF=(Ng-NF)/(NF-NC)$$

$$\Delta\theta gF=\theta gF-(0.6438-0.001682\ \nu d),$$

when the Abbe number and the anomalous dispersion of a material for the negative lens A are referred to as νdA and ΔθgFA, respectively,
when the Abbe number and the anomalous dispersion of a material for the negative lens B are referred to as νdB and ΔθgFB, respectively,
when the Abbe number and the anomalous dispersion of a material for the positive lens C are referred to as νdC and ΔθgFC, respectively, and
when the Abbe number and the anomalous dispersion of a material for the positive lens D are referred to as νdD and ΔθgFD, respectively,
conditional equations of $$0.020<\Delta\theta gFA<0.040$$

$$0.030<\Delta\theta gFB<0.055$$

$$0.020<\Delta\theta gFC<0.040$$

$$0.030<\Delta\theta gFD<0.055$$

$$\nu dB-\nu dA>55.0$$

$$\nu dD-\nu dC>55.0$$

are satisfied.

2. The projection optical system according to claim 1, wherein
when power values for positive lenses located on the enlargement conjugate side and negative lenses located on the reduction conjugate side when viewed from the aperture stop are referred to as $\Phi ai$ in order from the enlargement conjugate side,
when power values for negative lenses located on the enlargement conjugate side and positive lenses located on the reduction conjugate side when viewed from the aperture stop are referred to as $\Phi bi$ in order from the enlargement conjugate side,
when partial dispersion ratio values of materials of the positive lenses located on the enlargement conjugate side and the negative lenses located on the reduction conjugate side when viewed from the aperture stop are referred to as θgFai in order from the enlargement conjugate side,
when partial dispersion ratio values of materials of the negative lenses located on the enlargement conjugate side and the positive lenses located on the reduction conjugate side when viewed from the aperture stop are referred to as θgFbi in order from the enlargement conjugate side,
when an average value of the partial dispersion ratio values θgFai is referred to as θgFa, and when an average value of the partial dispersion ratio values θgFbi is referred to as θgFb, conditional equations of $$0<\Sigma|\Phi ai\times\theta gFai|/\Sigma|\Phi ai|-\Sigma|\Phi bi\times\theta gFbi|/\Sigma|\Phi bi|<0.019$$

$$-0.010<(\theta gFa)-(\theta gFb)<0.010$$

are satisfied.

3. The projection optical system according to claim 1, wherein
when an effective diameter of the negative lens located closest to the reduction conjugate side is referred to as $\Phi sn$, and
when an effective diameter of the positive lens located closest to the reduction conjugate side is referred to as $\Phi sp$,
a conditional equation of $$0.40<\Phi sn/\Phi sp<0.50$$

is satisfied.

4. The projection optical system according to claim 1, wherein
a first lens unit having negative refractive power, a second lens unit having positive refractive power, a third lens unit having positive refractive power, a fourth lens unit having negative refractive power, a fifth lens unit having positive refractive power, and a sixth lens unit having positive refractive power are included in this order from the enlargement conjugate side to the reduction conjugate side, and
distances between the adjacent lens units change during zooming.

5. The projection optical system according to claim 4, wherein
the second to fifth lens units move to the enlargement conjugate side along different loci from those of each other during zooming from the wide angle end to the telephoto end.

6. A projection optical system comprising:
a plurality of positive lenses and a plurality of negative lenses; and
an aperture stop arranged between a negative lens A arranged closest to an enlargement conjugate side out of the plurality of negative lenses and a positive lens C arranged closest to a reduction conjugate side out of the plurality of positive lenses,
wherein,
when a negative lens arranged at a position closest to the aperture stop, among negative lenses whose lens surfaces are arranged in a range up to a position separated in 0.22 L to the reduction conjugate side from a vertex of a lens surface arranged closest to the enlargement conjugate side is referred to as a negative lens B when a distance from the vertex of the lens surface arranged closest to the enlargement conjugate side to a vertex of a lens surface arranged closest to the reduction conjugate side is referred to as a total optical length L, when a positive lens arranged at a position closest to the aperture stop, among positive lenses whose lens surfaces are arranged in a range up to a position separated in 0.135 L to the enlargement conjugate side from the vertex of the lens surface arranged closest to the reduction conjugate side is referred to as a positive lens D, when a refractive index for a d line (wavelength: 587.6 nm) of a material is referred to as Nd, when a refractive index for an F line (wavelength: 486.1 nm) of a material is referred to as NF, when a refractive index for a g line (wavelength: 435.8 nm) of a material is referred to as Ng, when a refractive index for a C line (wavelength: 656.3 nm) of a material is referred to as Nc, when an Abbe number νd, a partial dispersion ratio θgF, and anomalous dispersion ΔθgF are defined as $$\nu d = (Nd-1)/(NF-NC)$$

$$\theta gF = (Ng-NF)/(NF-NC)$$

$$\Delta\theta gF = \theta gF - (0.6438 - 0.001682\ \nu d),$$

when the Abbe number and the anomalous dispersion of a material for the negative lens A are referred to as νdA and ΔθgFA, respectively, when the Abbe number and the anomalous dispersion of a material for the negative lens B are referred to as νdB and ΔθgFB, respectively, when the Abbe number and the anomalous dispersion of a material for the positive lens C are referred to as νdC and ΔθgFC, respectively, and when the Abbe number and the anomalous dispersion of a material for the positive lens D are referred to as νdD and ΔθgFD, respectively, conditional equations of $$0.020 < \Delta\theta gFA < 0.040$$

$$0.030 < \Delta\theta gFB < 0.055$$

$$0.020 < \Delta\theta gFC < 0.040$$

$$0.030 < \Delta\theta gFD < 0.055$$

$$\nu dB - \nu dA > 55.0$$

$$\nu dD - \nu dC > 55.0$$

are satisfied.

7. An image projection apparatus comprising:
a projection optical system having a zooming function; and
an image display element forming an original image,
wherein the projection optical system includes:
a plurality of positive lenses and a plurality of negative lenses; and
an aperture stop arranged between a negative lens A arranged closest to an enlargement conjugate side out of the plurality of negative lenses and a positive lens C arranged closest to a reduction conjugate side out of the plurality of positive lenses,
wherein,
when a negative lens arranged at a position closest to the aperture stop, among negative lenses whose lens surfaces are arranged in a range up to a position separated in 0.22 L to the reduction conjugate side from a vertex of a lens surface arranged closest to the enlargement conjugate side both at a wide angle end and at a telephoto end is referred to as a negative lens B when a distance from the vertex of the lens surface arranged closest to the enlargement conjugate side to a vertex of a lens surface arranged closest to the reduction conjugate side is referred to as a total optical length L, when a positive lens arranged at a position closest to the aperture stop, among positive lenses whose lens surfaces are arranged in a range up to a position separated in 0.29 L to the enlargement conjugate side from the vertex of the lens surface arranged closest to the reduction conjugate side both at the wide angle end and at the telephoto end is referred to as a positive lens D, when a refractive index for a d line (wavelength: 587.6 nm) of a material is referred to as Nd, when a refractive index for an F line (wavelength: 486.1 nm) of a material is referred to as NF, when a refractive index for a g line (wavelength: 435.8 nm) of a material is referred to as Ng, when a refractive index for a C line (wavelength: 656.3 nm) of a material is referred to as Nc, when an Abbe number νd, a partial dispersion ratio θgF, and anomalous dispersion ΔθgF are defined as $$\nu d = (Nd-1)/(NF-NC)$$

$$\theta gF = (Ng-NF)/(NF-NC)$$

$$\Delta\theta gF = \theta gF - (0.6438 - 0.001682\ \nu d),$$

when the Abbe number and the anomalous dispersion of a material for the negative lens A are referred to as νdA and ΔθgFA, respectively, when the Abbe number and the anomalous dispersion of a material for the negative lens B are referred to as νdB and ΔθgFB, respectively, when the Abbe number and the anomalous dispersion of a material for the positive lens C are referred to as νdC and ΔθgFC, respectively, and when the Abbe number and the anomalous dispersion of a material for the positive lens D are referred to as νdD and ΔθgFD, respectively, conditional equations of $$0.020 < \Delta\theta gFA < 0.040$$

$$0.030 < \Delta\theta gFB < 0.055$$

$$0.020 < \Delta\theta gFC < 0.040$$

$$0.030 < \Delta\theta gFD < 0.055$$

$$\nu dB - \nu dA > 55.0$$

$$\nu dD - \nu dC > 55.0$$

are satisfied, and
the original image formed with use of the image display element is projected by the projection optical system.

8. An image projection apparatus comprising:
a projection optical system; and
an image display element forming an original image,
wherein the projection optical system includes:
a plurality of positive lenses and a plurality of negative lenses; and
an aperture stop arranged between a negative lens A arranged closest to an enlargement conjugate side out of the plurality of negative lenses and a positive lens C arranged closest to a reduction conjugate side out of the plurality of positive lenses,
wherein,
when a negative lens arranged at a position closest to the aperture stop, among negative lenses whose lens surfaces are arranged in a range up to a position separated in 0.22 L to the reduction conjugate side from a vertex of a lens surface arranged closest to the enlargement conjugate side is referred to as a negative lens B when a distance from the vertex of the lens surface arranged closest to the enlargement conjugate side to a vertex of a lens surface arranged closest to the reduction conjugate side is referred to as a total optical length L, when a positive lens arranged at a position closest to the aperture stop, among positive lenses whose lens surfaces are arranged in a range up to a position separated in 0.135 L to the enlargement conjugate side from the vertex of the lens surface arranged closest to the reduction conjugate side is referred to as a positive lens D, when a refractive index for a d line (wavelength: 587.6 nm) of a material is referred to as Nd, when a refractive index for an F line (wavelength: 486.1 nm) of a material is referred to as NF, when a refractive index for a g line (wavelength: 435.8 nm) of a material is referred to as Ng, when a refractive index for a C line (wavelength: 656.3 nm) of a material is referred to as Nc, when an Abbe number νd, a partial dispersion ratio θgF, and anomalous dispersion ΔθgF are defined as νd=(Nd−1)/(NF−NC)

θgF=(Ng−NF)/(NF−NC)

ΔθgF=θgF−(0.6438−0.001682 νd), when the Abbe number and the anomalous dispersion of a material for the negative lens A are referred to as νdA and ΔθgFA, respectively, when the Abbe number and the anomalous dispersion of a material for the negative lens B are referred to as νdB and ΔθgFB, respectively, when the Abbe number and the anomalous dispersion of a material for the positive lens C are referred to as νdC and ΔθgFC, respectively, and when the Abbe number and the anomalous dispersion of a material for the positive lens D are referred to as νdD and ΔθgFD, respectively, conditional equations of 0.020<ΔθgFA<0.040

0.030<ΔθgFB<0.055

0.020<ΔθgFC<0.040

0.030<ΔθgFD<0.055

νdB−νdA>55.0

νdD−νdC>55.0 are satisfied, and the original image formed with use of the image display element is projected by the projection optical system.

* * * * *